(12) United States Patent
Moribe

(10) Patent No.: US 11,657,245 B2
(45) Date of Patent: May 23, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shoei Moribe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 17/498,786

(22) Filed: Oct. 12, 2021

(65) Prior Publication Data

US 2022/0027692 A1     Jan. 27, 2022

Related U.S. Application Data

(63) Continuation of application No. PCT/JP2020/015317, filed on Apr. 3, 2020.

(30) Foreign Application Priority Data

Apr. 15, 2019   (JP) .............................. JP2019-077340

(51) Int. Cl.
*G06K 15/02*     (2006.01)
*G06K 15/10*     (2006.01)
*B41J 2/21*      (2006.01)

(52) U.S. Cl.
CPC ........ *G06K 15/1878* (2013.01); *B41J 2/2132* (2013.01); *G06K 15/102* (2013.01); *G06K 15/1876* (2013.01); *G06K 15/1881* (2013.01)

(58) Field of Classification Search
CPC ............. G06K 15/1878; G06K 15/102; G06K 15/1876; G06K 15/1881; B41J 2/2132
See application file for complete search history.

(56) References Cited

U.S. PATENT DOCUMENTS 6,250,733 B1   6/2001  Yao et al.
9,894,250 B2   2/2018  Moribe
(Continued)

FOREIGN PATENT DOCUMENTS

JP   H07508622 A   9/1995
JP   2003231302 A  8/2003
(Continued)

OTHER PUBLICATIONS

International Search Report issued by the Japan Patent Office dated Jun. 23, 2020 in corresponding International Application No. PCT/JP2020/015317, with English translation.

(Continued)

*Primary Examiner* — Quang N Vo
(74) *Attorney, Agent, or Firm* — Carter, DeLuca & Farrell LLP

(57) ABSTRACT

Multiple first gradation values corresponding respectively to the multiple inks are quantized to generate multiple first quantized values indicating printing or non-printing of dots with the respective inks. In this case, multiple second gradation values corresponding respectively to multiple multinary colors expressible by combinations of overlapping of the multiple inks are generated based on the first gradation values. Next, the multiple second gradation values are quantized to generate multiple second quantized values indicating printing or non-printing of dots of the respective multinary colors. Then, the first quantized values corresponding to the inks to be overlapped one on top of another to express the multinary colors are generated based on the second quantized values corresponding respectively to the multiple multinary colors.

20 Claims, 19 Drawing Sheets

(56) References Cited

U.S. PATENT DOCUMENTS

| | | |
|---|---|---|
| 10,026,156 B2 | 7/2018 | Moribe |
| 10,205,854 B2 | 2/2019 | Shimada et al. |
| 10,506,135 B2 | 12/2019 | Moribe et al. |
| 10,523,844 B2 | 12/2019 | Moribe et al. |
| 10,638,020 B2 | 4/2020 | Ochiai et al. |
| 11,090,932 B2 | 8/2021 | Moribe |
| 2011/0085183 A1* | 4/2011 | Tsuchiya ............ H04N 1/40068 358/1.2 |
| 2011/0085218 A1 | 4/2011 | Bernal |
| 2015/0092241 A1* | 4/2015 | Hori .................. G06K 15/1878 358/2.1 |
| 2019/0052775 A1 | 2/2019 | Suzuki et al. |
| 2021/0006758 A1 | 1/2021 | Moribe |
| 2022/0030136 A1 | 1/2022 | Moribe et al. |

FOREIGN PATENT DOCUMENTS

| | | |
|---|---|---|
| JP | 2004503186 A | 1/2004 |
| JP | 2006021412 A | 1/2006 |
| JP | 2015092661 A | 5/2015 |
| JP | 2016140067 A | 8/2016 |
| JP | 2017038127 A | 2/2017 |

OTHER PUBLICATIONS

Extended European Search Report issued in corresponding EP Patent Application No. 20791464.9, dated Nov. 15, 2022, pp. 1-10.

* cited by examiner

| ORDER OF COLOR | COLOR ELEMENT | NUMBER OF ELEMENTS |
|---|---|---|
| 0 | W | ONE TYPE |
| 1 | C,M,Y,K | FOUR TYPES |
| 2 | CM,CY,CK,MY,MK,YK | SIX TYPES |
| 3 | CMY,CMK,CYK,MYK | FOUR TYPES |
| 4 | CMYK | ONE TYPES |

FIG.6A

| ORDER OF COLOR | COLOR ELEMENT | NUMBER OF ELEMENTS |
|---|---|---|
| 0 | W | ONE TYPE |
| 1 | C,M,Y,K,G | FIVE TYPES |
| 2 | CM,CY,CK,CG,MY,MK,MG,YK,YG,KG | TEN TYPES |
| 3 | CMY,CMK,CMG,CYK,CYG,CGK,MYK,MYG,MGK,YKG | TEN TYPES |
| 4 | CMYK,CMYG,CMGK,CYKG,MYKG | FIVE TYPES |
| 5 | CMYKG | ONE TYPE |

FIG.6B

IN CASE WHERE InC=2400, InM=1920, InY=480, AND InK=3200

| MULTINARY COLOR | W | Y | M | C | MY | CY | CM | CMY | K | YK | MK | CK | MYK | CYK | CMK | CMYK |
|---|---|---|---|---|---|---|---|---|---|---|---|---|---|---|---|---|
| INITIAL VALUE | 4095 | 0 | 0 | 0 | 0 | 0 | 0 | 0 | 0 | 0 | 0 | 0 | 0 | 0 | 0 | 0 |
| AFTER PROCESSING ON InK | 895 | 0 | 0 | 0 | 0 | 0 | 0 | 0 | 3200 | 0 | 0 | 0 | 0 | 0 | 0 | 0 |
| AFTER PROCESSING ON InC | 0 | 0 | 0 | 895 | 0 | 0 | 0 | 0 | 1695 | 0 | 0 | 1505 | 0 | 0 | 0 | 0 |
| AFTER PROCESSING ON InM | 0 | 0 | 0 | 0 | 0 | 0 | 895 | 0 | 670 | 0 | 1025 | 1505 | 0 | 0 | 0 | 0 |
| AFTER PROCESSING ON InY | 0 | 0 | 0 | 0 | 0 | 0 | 415 | 480 | 670 | 0 | 1025 | 1505 | 0 | 0 | 0 | 0 |

FIG.8

IN CASE WHERE InC=2400, InM=1280, InY=0, InK=0, AND InG=2400

| MULTINARY COLOR | W | Y | M | C | G | MY | CY | YG | CG | CM | CMG | MYG | CMY | CYG | CMYG | YK | MK | CK | KG | CKG | MYK | CYK | MYGK | CYGK | CMYK | CMGK | CMYGK |
|---|---|---|---|---|---|---|---|---|---|---|---|---|---|---|---|---|---|---|---|---|---|---|---|---|---|---|---|
| INITIAL VALUE | 4095 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| AFTER PROCESSING ON InG | 1695 | 0 | 0 | 0 | 2400 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| AFTER PROCESSING ON InC | 0 | 0 | 0 | 1695 | 1855 | 0 | 0 | 0 | 545 | 0 | 0 | 0 | 0 | 0 | 0 | 0 | 0 | 0 | 0 | 0 | 0 | 0 | 0 | 0 | 0 | 0 | 0 |
| AFTER PROCESSING ON InM | 0 | 0 | 0 | 415 | 1855 | 0 | 0 | 0 | 545 | 1280 | 0 | 0 | 0 | 0 | 0 | 0 | 0 | 0 | 0 | 0 | 0 | 0 | 0 | 0 | 0 | 0 | 0 |

FIG.11

IN CASE WHERE InC=1600, InM=1920, InY=1440, InK=0, Inc=960, AND Inm=480

| MULTINARY COLOR | W | Y | m | c | M | C | mY | cY | cm | MY | CY | cM | Cm | CM |
|---|---|---|---|---|---|---|---|---|---|---|---|---|---|---|
| INITIAL VALUE | 4095 | 0 | 0 | 0 | 0 | 0 | 0 | 0 | 0 | 0 | 0 | 0 | 0 | 0 |
| AFTER PROCESSING ON InC | 2495 | 0 | 0 | 0 | 0 | 1600 | 0 | 0 | 0 | 0 | 0 | 0 | 0 | 0 |
| AFTER PROCESSING ON InM | 575 | 0 | 0 | 0 | 1920 | 1600 | 0 | 0 | 0 | 0 | 0 | 0 | 0 | 0 |
| AFTER PROCESSING ON Inc | 0 | 0 | 0 | 575 | 1535 | 1600 | 0 | 0 | 0 | 0 | 0 | 0 | 0 | 0 |
| AFTER PROCESSING ON Inm | 0 | 0 | 0 | 95 | 1535 | 1600 | 0 | 0 | 480 | 0 | 0 | 385 | 0 | 0 |
| AFTER PROCESSING ON InY | 0 | 0 | 0 | 0 | 190 | 1600 | 0 | 95 | 480 | 1345 | 0 | 385 | 0 | 0 |

FIG.14

IN CASE WHERE InC=4592, InM=0, InY=0, AND InK=5104

| MULTINARY COLOR | W | C | CC | K | CK | CCK | KK | CKK | CCKK |
|---|---|---|---|---|---|---|---|---|---|
| INITIAL VALUE | 4095 | 0 | 0 | 0 | 0 | 0 | 0 | 0 | 0 |
| AFTER PROCESSING ON InK | 0 | 0 | 0 | 3086 | 0 | 0 | 1009 | 0 | 0 |
| AFTER PROCESSING ON InC | 0 | 0 | 0 | 0 | 1580 | 1506 | 1009 | 0 | 0 |

FIG.17

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2020/015317, filed Apr. 3, 2020, which claims the benefit of Japanese Patent Application No. 2019-077340, filed Apr. 15, 2019, both of which are hereby incorporated by reference herein in their entirety.

BACKGROUND OF THE INVENTION

Field of the Invention

The present invention relates to an image processing apparatus, an image processing method, and a storage medium for printing an image on a print medium by performing quantization processing.

Background Art

In the case of printing an image by using a pseudo gradation method, image data with multiple levels needs to be quantized. An error diffusion method and a dither method are known as quantization methods used in this case. Particularly, the dither method in which a gradation value of the multi-level data is compared with a threshold stored in advance to determine whether to print a dot requires lower processing load than the error diffusion method and is used in many image processing apparatuses. In such a dither method, dispersiveness of dots in a low gradation region sometimes becomes a problem. PTL 1 proposes a dither method using a threshold matrix with blue noise characteristics as a threshold matrix for obtaining favorable dot dispersiveness.

PTL 2 discloses a dither method which solves the following problem: although favorable dispersiveness can be obtained for each color channel (that is, single color), dispersiveness deceases and graininess becomes obvious in the case where an image is printed by using multiple color channels (that is, mixed colors). Specifically, PTL 2 discloses a method in which a common threshold matrix with favorable dispersiveness is prepared and quantization processing is performed with thresholds shifted among multiple colors. In this specification, such quantization method is hereafter referred to as inter-color processing. In the inter-color processing, dots of different colors are printed exclusively with high dispersiveness in a low gradation portion. Accordingly, a favorable image in which dots are favorably dispersed can be outputted also in a mixed color image.

PTL 3 discloses inter-color processing for suppressing graininess in an entire image in a situation where the image is printed by using multiple inks varying in dot power. Specifically, two threshold matrices are prepared and colors are divided into a color group to be subjected to inter-color processing using a first threshold matrix and a color group to be subjected to inter-color processing using a second threshold matrix to obtain favorable dispersiveness in each group.

In the case where a threshold matrix having a blue noise characteristic is used, arranging dots at pixels positions corresponding to consecutive thresholds from the minimum value 0 allows the dot arrangement to have a preferable blue noise characteristic. Accordingly, in the case where the inter-color processing is performed by using the threshold matrix having the blue noise characteristic, dispersity of an ink color set as a first color among multiple ink colors can be made particularly high.

In PTL 2 and PTL 3, the black ink that has the lowest lightness (has the highest dot power and is thus most obvious on the print medium) among the inks of multiple colors is set as the first color in the inter-color processing while using the threshold matrix with blue noise characteristics. Setting the order of colors in the inter-color processing such that the ink with lower lightness is quantized earlier as described above can suppress graininess in the entire image.

Citation List

Patent Literature
PTL 1: Published Japanese Translation of PCT International Application No. Hei 07-508622
PTL 2: Published Japanese Translation of PCT International Application No. 2004-503186
PTL 3: Japanese Patent Laid-Open No. 2017-38127

In the configuration using inks of multiple colors, a situation where dots overlap one another on a print medium occurs with an increase in the gradation values of the respective colors. In this case, the dot power of an overlapping dot formed by overlapping of dots of different colors is higher than the dot power of a single-color dot. However, in the inter-color processing of PTL 2 and PTL 3, quantization processing taking into consideration of dispersity of overlapping dots is not performed. Accordingly, the overlapping dots with a high dot power sometimes make the graininess of the entire image stand out.

Specific description is given. For example, assume a case concerning three colors of black, cyan, and magenta. In a single color, black has the highest dot power and is set to the first color in general inter-color processing to obtain highest dispersiveness. However, for example, overlapping dots of black and magenta each having higher dot power than a single-color dot of black are not arranged with high dispersiveness. Accordingly, in an image as whole, there is a case where the overlapping dots with a higher dot power than the single-color dots of black make the graininess of the entire image stand out.

The present invention has been made to solve the aforementioned problem. Accordingly, an object thereof is to provide an image processing apparatus and an image processing method that can suppress graininess and output a uniform and smooth image in the case where the image is printed by using multiple inks varying in dot powers.

SUMMARY OF THE INVENTION

To this end, the present invention provides an image processing apparatus that generates a plurality of first quantized values based on a plurality of first gradation values corresponding respectively to a plurality of inks for each of pixels, the first quantized values indicating printing or non-printing dots with the respective inks, characterized in that the image processing apparatus comprises: a conversion unit configured to convert the plurality of first gradation values to a plurality of second gradation values corresponding respectively to a plurality of multinary colors expressible by combinations of overlapping of the plurality of inks; a quantization unit configured to quantize the plurality of second gradation values and generate a plurality of second quantized values indicating printing or non-printing of dots of the respective multinary colors; and a generation unit configured to generate the first quantized values corresponding to the plurality of inks based on the second quantized values corresponding respectively to the plurality of multinary colors.

Further features of the present invention will become apparent from the following description of exemplary embodiments with reference to the attached drawings.

BRIEF DESCRIPTION OF THE DRAWINGS

FIGS. 6A and 6B are tables illustrating types of multinary colors;

FIG. 8 is a table for explaining steps of the multinary color conversion processing in a first embodiment;

FIG. 11 is a table for explaining steps of multinary color conversion processing in a second embodiment;

FIG. 14 is a table for explaining steps of multinary color conversion processing in a third embodiment;

FIG. 17 is a table for explaining steps of multinary color conversion processing in a fifth embodiment;

DESCRIPTION OF THE EMBODIMENTS

First Embodiment (Apparatus Configuration)

Figure 1A:
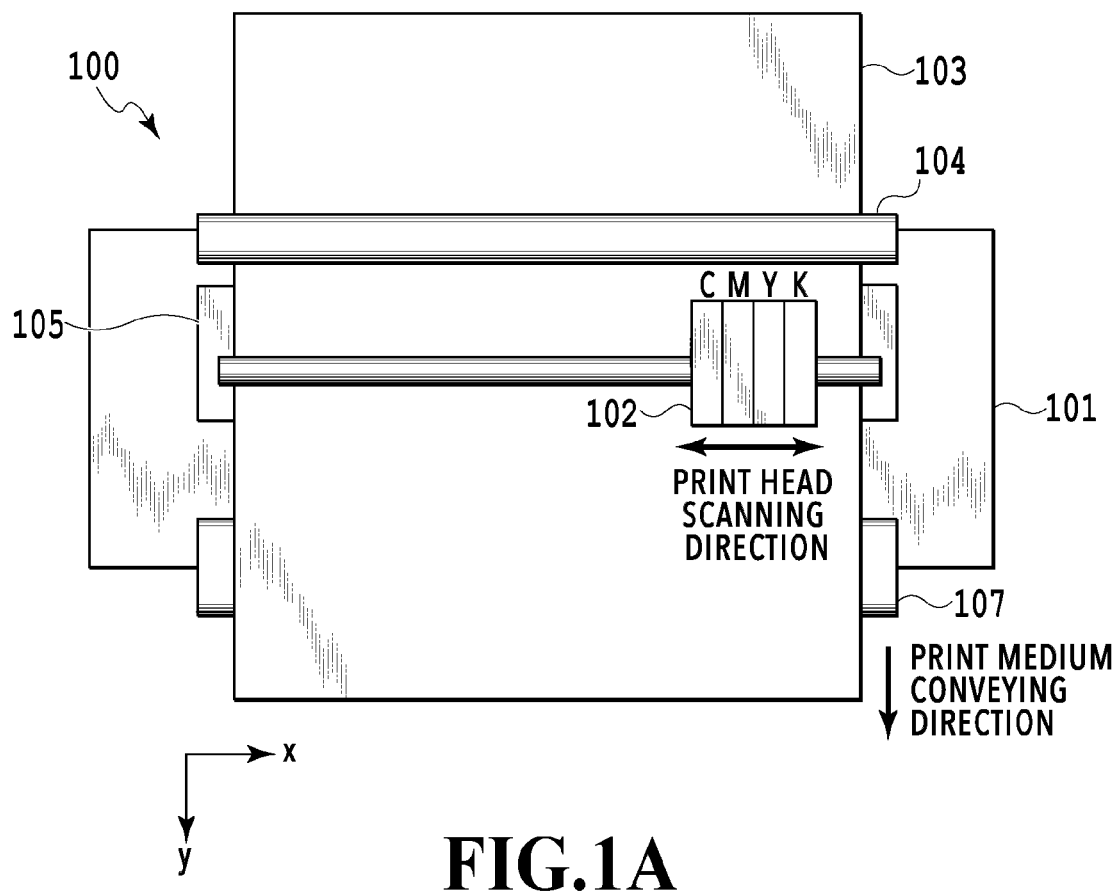
FIGS. 1A and 1B are schematic configuration diagrams of an inkjet printing apparatus and a print head.
Figure 1B:
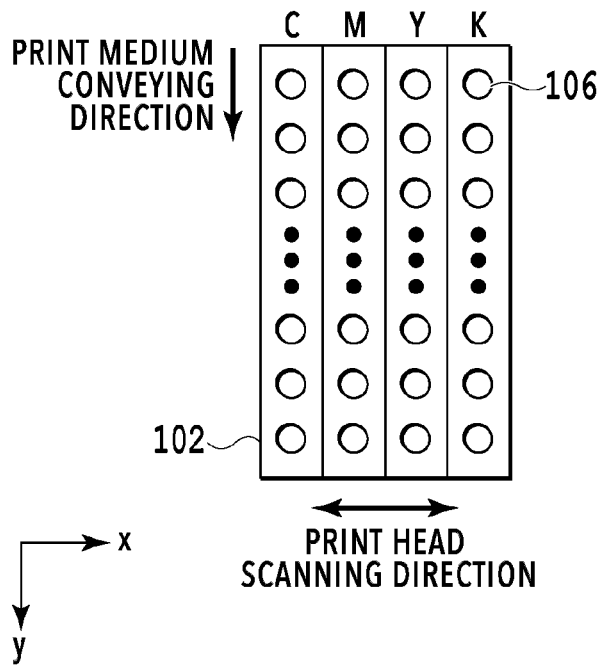

FIGS. 1A and 1B are schematic configuration diagrams of an inkjet printing apparatus 100 (hereafter also simply referred to as printing apparatus 100) usable in the present embodiment and a print head 102 mountable in the printing apparatus 100. The printing apparatus 100 of the present embodiment is a serial inkjet printing apparatus and the print head 102 is capable of reciprocating in an x-direction in FIGS. 1A and 1B.

In the print head 102, nozzle rows which eject inks of cyan (C), magenta (M), yellow (Y), and black (K), respectively, are arranged in the x-direction and, in each nozzle row, nozzles 106 which eject the ink are arranged in a y-direction. In FIG. 1B, although the nozzles which eject the ink of the same color are arranged in one row in the y-direction in each nozzle row, the nozzle row of each color may include multiple nozzle rows which eject the ink of the same color.

Relationships between the inks and dot power are described. In this specification, the dot power can be interpreted as visual obviousness and is based on the lightness of a dot formed by applying the ink on a print medium as a droplet. Specifically, the lower the lightness of the dot of the ink is, the higher the visual obviousness of the dot is, and the higher the dot power thereof is. In contrast, the higher the lightness of the dot of the ink is, the lower the visual obviousness of the dot is, and the lower the dot power thereof is. In the present embodiment, dots were formed on a print medium by using inks of four colors to be used and the level of the dot power of each color was checked based on a result obtained by measuring the lightness $L^*$ in the $CIEL^*a^*b^*$ color space. As a result, black (K) had the highest dot power among the four colors to be used. Then, it was checked that the descending order of the dot power was cyan (C), magenta (M), and yellow (Y). The dot power of an overlapping dot is higher than the dot power of each of single-color dots formed with colors of the respective inks forming this overlapping dot, but depends on a combination of the overlapping inks. For example, in the present embodiment, the dot power of the overlapping dot of cyan and magenta is higher than the dot power of the single-color dot of cyan and the dot power of the single-color dot of magenta but is lower than the dot power of the single-color dot of black.

Returning to the explanation of FIG. 1A, a region of a print medium 103 to which the print head 102 performs printing is held between a conveyance roller 104 and a discharge roller 107 and is maintained to be flat and smooth. Moreover, a platen 105 is arranged at a position facing an ejection port surface of the print head 102 and supports the print medium 103 subjected to printing from the back side.

In the aforementioned configuration, the print head 102 moves in the x-direction while ejecting the inks according to print data to perform one print scanning operation. In the case where such one print scanning operation is performed, the conveyance rollers 104 and the discharge rollers 107 turn and convey the print medium 103 in the y-direction by a distance corresponding to a print width of the print head 102. Then, such a print scanning operation by the print head 102 and such a conveyance operation of the print medium 103 are alternately repeated and an image is printed on the print medium 103 step by step.

(System Configuration)

Figure 2:
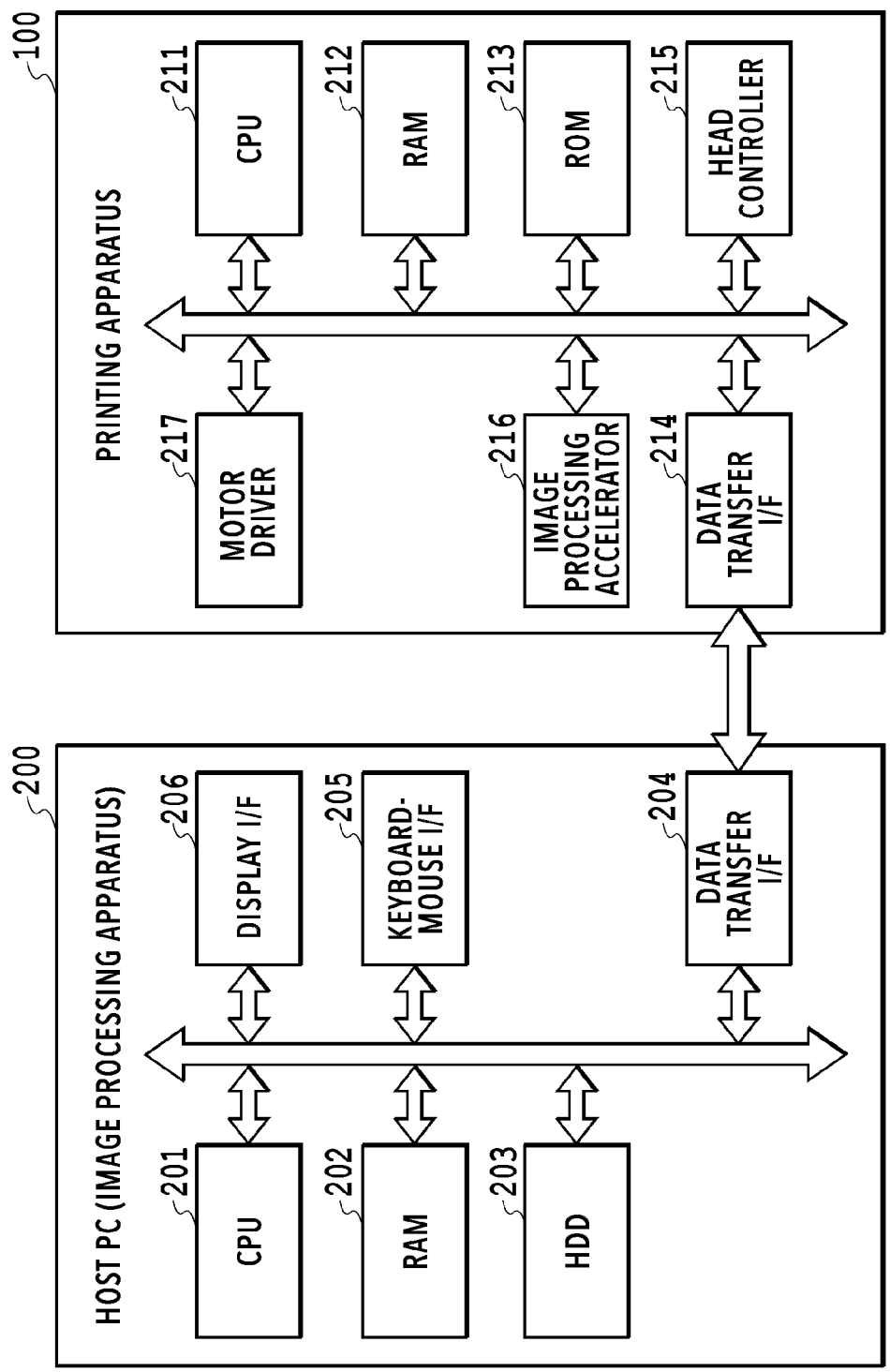
FIG. 2 is a block diagram illustrating a configuration of control of an inkjet printing system.

FIG. 2 is a block diagram illustrating a configuration of control of an inkjet printing system usable in the present embodiment. The inkjet printing system in the present embodiment includes the printing apparatus 100 and a host PC 200 as an image processing apparatus. A driver installed in the host PC 200 will be explained as an example of the image processing apparatus according to the present embodiment. Image data subjected to predetermined image processing in the host PC 200 is sent to the printing apparatus 100 and is subjected to printing processing by the print head 102 (not illustrated in FIG. 2).

In the host PC 200, a CPU 201 controls the entire host PC 200 according to a program stored in a HDD 203 by using a RAM 202 as a work area. The RAM 202 is a volatile memory unit and temporarily stores programs and data. The HDD 203 is a non-volatile memory unit and also stores programs and data. The CPU 201 performs the predetermined image processing on the image data to be printed by the printing apparatus 100 and then sends the image data to the printing apparatus 100 via a data transfer I/F 204.

The data transfer I/F 204 is an I/F for controlling exchange of data with the printing apparatus 100. USB, IEEE1394, LAN, or the like can be used as a connection method. A keyboard-mouse I/F 205 is an I/F for controlling not-illustrated human interface devices (HIDs) such as a keyboard and a mouse. A user inputs various settings and commands by using the keyboard and the mouse and the keyboard-mouse I/F 205 sends the inputted settings and commands to the CPU 201. A display I/F 206 is an I/F for controlling a display screen in a not-illustrated display connected to the image processing apparatus 200. The user can check various pieces of information through screens displayed on the display by the CPU 201 via the display I/F 206.

Meanwhile, in the printing apparatus 100, a CPU 211 controls the entire printing apparatus 100 according to a program stored in a ROM 213 by using a RAM 212 as a work area. The RAM 212 is a volatile memory unit and temporarily stores programs and data. The ROM 213 is a non-volatile memory unit and also stores programs and data.

A data transfer I/F 214 controls exchange of data with the host PC 200. An image processing accelerator 216 is hardware capable of executing image processing at higher speed than the CPU 211. The image processing accelerator 216 is activated in the case where the CPU 211 writes parameters necessary for the image processing and the image data received from the data transfer I/F 214 into a predetermined address of the RAM 212. Then, the image processing accelerator 216 performs the predetermined image processing on the image data and generates print data for driving the print head 102.

A motor driver 217 is a driver for driving various motors in the printing apparatus 100 such as a carriage motor configured to move a carriage in which the print head 102 is mounted in the x-direction and a conveyance motor configured to rotate the conveyance rollers 104 and the discharge rollers 107. Ahead controller 215 is a driver for driving the print head 102 according to the print data.

In the case where the image processing accelerator 216 generates the print data, the CPU 211 drives the various motors via the motor driver 217 and causes the print head 102 to perform a printing operation according to the print data via the head controller 215.

Note that, in the present embodiment, the image processing accelerator 216 is not an essential element. In the case where the CPU 211 has a sufficient processing performance, the CPU 211 may execute the predetermined image processing.

(Image Processing Flow)

Figure 3:
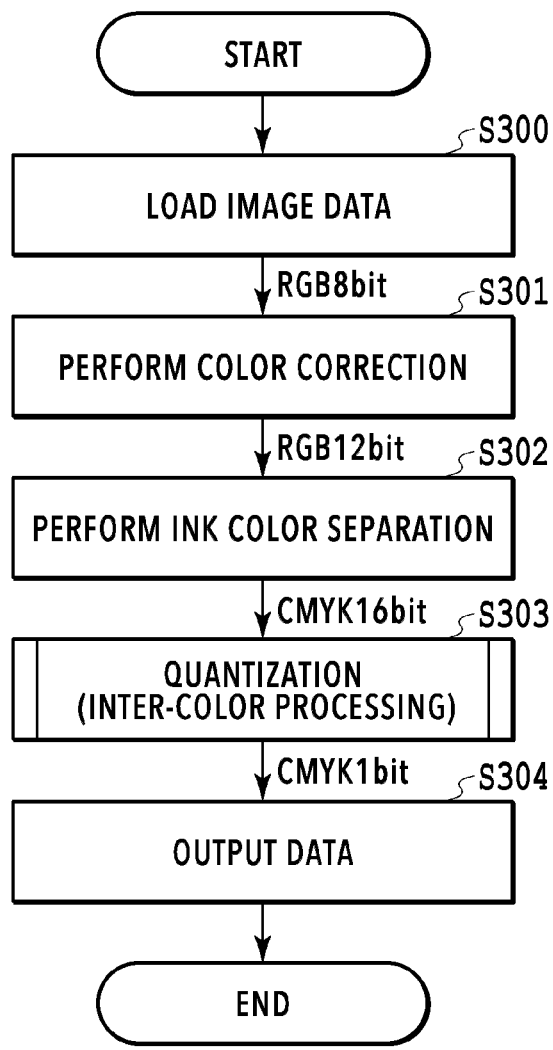
FIG. 3 is a flowchart for explaining image processing.

FIG. 3 is a flowchart for explaining the image processing executed by the CPU 201 of the host PC 200. The CPU 201 reads and executes a program capable of implementing the flowchart illustrated in FIG. 3 to implement various configurations (functions). This processing is started in the case where the user inputs a print command for printing a predetermined image. Note that steps are expressed by "S" attached prior to the reference numerals in the following description.

In the case where this processing is started, in S300, the CPU 201 loads the image data to be printed into the RAM 202. In this case, the loaded image data is data formed of multiple pixels each having brightness values of red (R), green (G), and blue (B) expressed in 8-bits (256 gradation levels). Hereafter, image data which is a collection of pixels formed of multiple color elements (RGB) as described above is referred to as, for example, "RGB data."

In S301, the CPU 201 performs color correction processing on the RGB data loaded in S300. The color correction processing is processing in which a color space standardized in sRGB or the like is associated with a color space which can be expressed by the printing apparatus 100. Specifically, the CPU 201 converts the 8-bit RGB data to 12-bit R'G'B' data by referring to a three-dimensional lookup table stored in the HDD 203.

In S302, the CPU 201 performs ink color separation processing on the R'G'B' data obtained in S301. The ink color separation processing is processing in which the R'G'B' data indicating the brightness values is converted to image data indicating gradation values corresponding to the respective ink colors used in the printing apparatus 100. Specifically, the CPU 201 converts the 12-bit R'G'B' data to 16-bit CMYK data indicating gradation values of cyan (C), magenta (M), yellow (Y), and black (K) by referring to a three-dimensional lookup table.

In S303, the CPU 201 performs quantization processing on the 16-bit CMYK data. In the present embodiment, the 16-bit CMYK data is quantized into binary 1-bit data indicating printing (1) or non-printing (0) for each pixel. Details of the quantization processing are described later.

In S304, the CPU 201 outputs 1-bit data for each color obtained by the quantization processing in S303 to the printing apparatus 100 via the data transfer I/F 204. The processing is thus completed.

Note that, although description is given above of the mode in which the host PC 200 performs all of the steps described in FIG. 3, the image processing accelerator 216 (see FIG. 2) of the printing apparatus 100 may perform some or all of the steps described in FIG. 3.

(Details of Quantization Processing)

Figure 4:
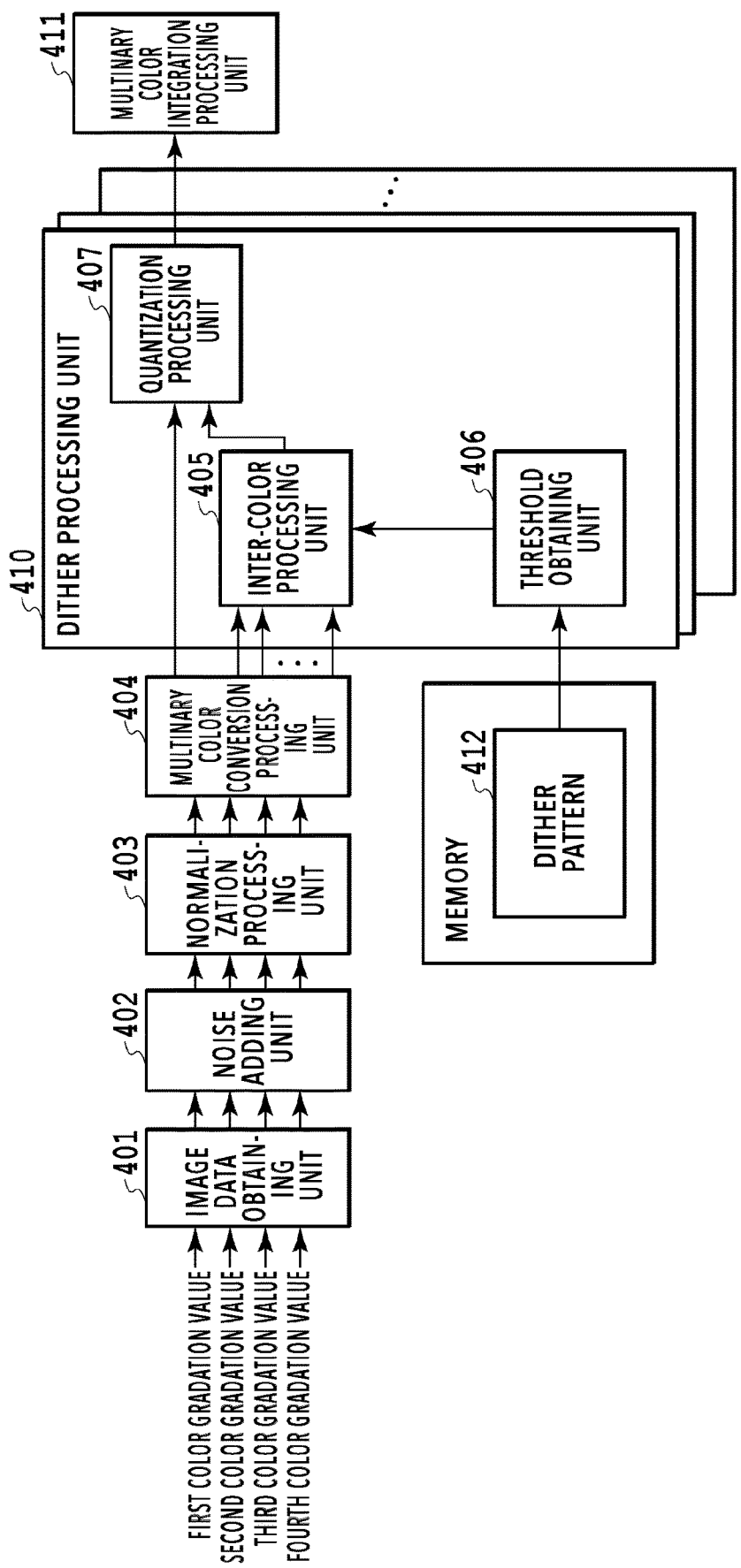
FIG. 4 is a block diagram for explaining details of quantization processing.

FIG. 4 is a block diagram for explaining details of logical configuration of the quantization processing executed in S303 of FIG. 3. In the quantization processing of the present embodiment, first, processing relating to the gradation values of each inputted pixel is performed, then processing relating to a threshold is performed, and lastly quantization processing using a dither method is performed. The series of these processes is performed in parallel for all colors (all channels).

An image data obtaining unit 401 obtains 16-bit gradation values of the respective ink colors for each pixel. FIG. 4 illustrates a state where the 16-bit gradation values of the respective first to fourth colors are inputted.

A noise adding unit 402 adds predetermined noise to the 16-bit gradation values. Adding the noise can avoid a state where the same pattern is consecutively printed and reduce stripes, textures, and the like generated in the image printed on the print medium even if the pixels having the gradation values of the same level are consecutively arranged. In the noise adding unit 402, noise generated by using a code indicated by a predetermined random table, a fixed intensity, and a fluctuating intensity corresponding to an input value is added to the gradation values for each pixel. In this case, the random table is a table for setting positive or negative of the noise and positive, zero, or negative is set for each pixel position. In the present embodiment, there may be eight random tables at maximum and the table size of each table can be set to any size. The fixed intensity indicates the intensity of the noise amount and the magnitude of the noise is determined depending on this intensity. In the present embodiment, an optimal random table and an optimal fixed intensity are set for each print mode depending on the graininess of the image, degrees of stripes and texture, and the like and the noise amount is thereby adjusted to an appropriate amount.

A normalization processing unit 403 normalizes the 16-bit gradation values to which the noise is added into a range of 12 bits. Specifically, the normalization processing unit 403 normalizes the 65535-level gradation values expressed in 16 bits into 4096-level gradation values expressed in 12 bits.

The aforementioned processing of the image data obtaining unit 401 to the normalization processing unit 403 is performed in parallel for all colors (all channels). Then, the 12-bit data for the four colors indicating the gradation values of cyan, magenta, yellow, and black is inputted into a multinary color conversion processing unit 404.

The multinary color conversion processing unit 404 generates multinary color data based on the CMYK data obtained from the normalization processing unit 403. In this description, the multinary color data refers to gradation value data in which secondary colors such as CM and YK and tertiary colors such as CMY are held as independent color components (channels) like primary colors such as C, M, Y, and K.

FIG. 6A is a table illustrating types of multinary colors in the case where the four colors of cyan (C), magenta (M), yellow (Y), and black (K) are used as in the present embodiment. The zero-order color includes only W (white). The primary colors include four types of colors of C, M, Y, and K and the secondary colors include six types of colors of CM, CY, CK, MY, MK, and YK. The tertiary colors include four types of colors of CMY, CMK, CYK, and MYK and the quaternary color includes one type of color of CMYK. In other words, in multinary colors, each of the primary colors is also considered as one of the multinary colors.

The multinary color conversion processing unit 404 generates the multinary color data formed of 12-bit gradation values corresponding to the respective 15 multinary colors other than W, based on the CMYK data. The generated multinary color data is inputted into each of dither processing units 410 for 15 channels. Multinary color conversion processing is described in detail later.

Returning to the description of FIG. 4, in each of the dither processing units 410, the gradation value of a processing target color to be quantized among the gradation values of the multiple multinary colors outputted from the multinary color conversion processing unit 404 is sent to a quantization processing unit 407 as it is as a processing target gradation value. Meanwhile, the gradation values of the colors other than the processing target color are inputted into an inter-color processing unit 405 as reference gradation values. The inter-color processing unit 405 performs predetermined processing on a threshold obtained by a threshold obtaining unit 406 based on the reference gradation values to determine a final threshold and provides the determined threshold to the quantization processing unit 407. The quantization processing unit 407 compares the processing target gradation value with the threshold received from the inter-color processing unit 405 to generate a quantized value indicating printing (1) or non-printing (0) for the processing target color.

The threshold obtaining unit 406 selects one threshold matrix corresponding to the print mode from multiple dither patterns 412 stored in a memory such as the ROM and obtains a threshold for a pixel position of the processing target gradation value. In the present embodiment, each dither pattern 412 is a threshold matrix formed by arranging thresholds of 0 to 4095 such that the threshold matrix has blue noise characteristics. Each dither pattern 412 may have any size and shape such as 512×512 pixels, 256×256 pixels, and 512×256 pixels. Specifically, multiple threshold matrices varying in size and shape as described above are stored in advance in the memory and the threshold obtaining unit 406 selects the threshold matrix corresponding to the print mode from these threshold matrices. Then, the threshold obtaining unit 406 provides the threshold Dth(x, y) for the pixel position (x, y) of the processing target gradation value from multiple thresholds arranged in the selected threshold matrix to the inter-color processing unit 405.

A multinary color integration processing unit 411 integrates the quantized values of the respective multinary colors outputted from the quantization processing units 407. Specifically, regarding a pixel for which a quantized value of a multinary color that is the secondary color or higher indicates printing (1), the multinary color integration processing unit 411 sets quantized values of multiple primary colors forming this multinary color to printing (1). For example, in the case where the quantized value of CM that is one of the multinary colors is printing (1), the multinary color integration processing unit 411 sets both of the quantized value of cyan (C) and the quantized value of magenta (M) corresponding to the processed pixel to (1). The multinary color integration processing unit 411 integrates pieces of one-bit data for 15 channels into pieces of one-bit data for four channels to form print data corresponding to the ink colors.

(Multinary Color Conversion Processing)

Figure 7:
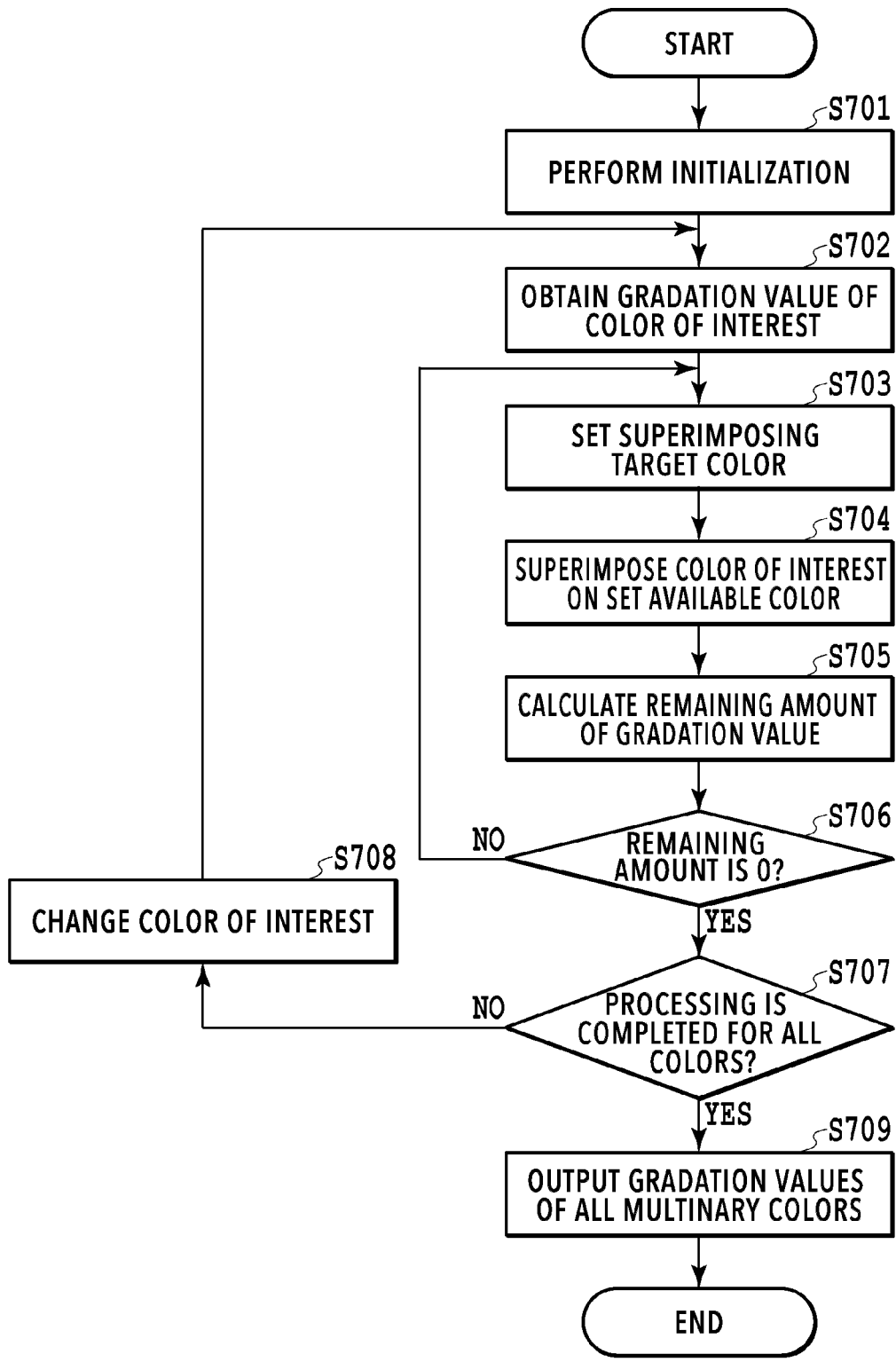
FIG. 7 is a flowchart for explaining multinary color conversion processing.

Next, the multinary color conversion processing executed by the multinary color conversion processing unit 404 of the present embodiment is described by using FIGS. 7 and 8. FIG. 7 is a flowchart for explaining the multinary color conversion processing. FIG. 8 is a table for specifically explaining steps of the multinary color conversion processing. In FIG. 8, fields arranged in the horizontal direction indicate the 16 types of multinary colors used in the present embodiment. W indicates white (non-printing) and CMYK indicates overlapping of cyan, magenta, yellow, and black. In FIG. 8, the 16 types of multinary colors are arranged in ascending order of the dot power from left to right. Specifically, this means that, in the case where an overlapping dot of each multinary color is printed in a combination of ink colors indicated by the multinary color by using two or more of the inks of four colors used in the present embodiment, the further to the right the field corresponding to this overlapping dot in the table of FIG. 8 is, the lower the lightness L* of this overlapping dot in the CIEL*a*b* color space is.

Description is given below of a specific example of processing performed in the case where the multinary color conversion processing unit 404 receives a cyan gradation value InC=2400, a magenta gradation value InM=1920, a yellow gradation value InY=480, and a black gradation value InK=3200 from the normalization processing unit 403.

Referring to FIG. 7, when this processing is started, the multinary color conversion processing unit 404 first performs initialization processing in S701. Specifically, as illustrated in the row of "initial value" in FIG. 8, the gradation value W of W (white) among the 16 multinary colors is set to the maximum value 4095 and the gradation values of the other multinary colors are set to 0. Moreover, black (K) among the four colors corresponding to the received gradation values InK, InC, InM, and InY is set as a color of interest. In this case, the color of interest is a color set for the sake of convenience to be used only in the multinary color conversion processing unit 404. The color of interest is changed in order hereinafter and processes of S702 to S706 are performed for each of the colors of interest. In the present embodiment, the color of interest is set in descending order of the dot power for the aforementioned four colors, that is in order of black, cyan, magenta, and yellow.

In S702, the multinary color conversion processing unit 404 obtains the received gradation value of the color of interest. In this case, InK=3200 is obtained.

In S703, the multinary color conversion processing unit 404 extracts an available color with the lowest dot power among all multinary colors and sets the extracted available color as a superimposing target color. In this case, the available color refers to a multinary color that does not include the color of interest as a component color and whose gradation value is not 0 at this stage. Specifically, in the case where the color of interest is black, YK, MK, CK, MYK, CYK, CMK, and CMYK are excluded from the available colors and, in the case where the gradation values at this stage are in a state indicated by the "initial value" in FIG. 8, W is the only available color. Accordingly, in S703 of this stage, the multinary color conversion processing unit 404 sets W as the superimposing target color.

In S704, the multinary color conversion processing unit 404 superimposes the color of interest on the superimposing target color set in S703. Specifically, the multinary color conversion processing unit 404 replaces the gradation value of the superimposing target color with as much of the gradation value Ink=3200 of the color of interest as possible and sets a replaced portion of the gradation value as the gradation value of the multinary color formed by the superimposing of the superimposing target color and the color of interest (overlapping of dots). In this example, since the gradation value InK=3200 of the color of interest is smaller than the gradation value W=4095 of the superimposing target color, the entire gradation value of the color of interest can be used to replace the gradation value of the superimposing target color. Then, the replaced portion of gradation value is set as the gradation value of the multinary color (that is K) formed by the superimposing of the superimposing target color W (white) and the color of interest K (K=3200). Meanwhile, a portion of the gradation value W=4095 of the superimposing target color that is not replaced with the gradation value of the color of interest is saved as a new gradation value W=W−K=4095−3200=895 of the superimposing target color.

In S705, the multinary color conversion processing unit 404 calculates a remaining gradation value ΔInK that is a portion of the gradation value Ink=3200 of the color of interest not superimposed in the multinary color. In this example, since the entire gradation value Ink=3200 of the color of interest is superimposed on the multinary color W, the remaining gradation value of the color of interest is ΔInK=0.

In S706, the multinary color conversion processing unit 404 determines whether the remaining gradation value ΔInk is 0 or not. If ΔInK=0, the processing proceeds to S707. If ΔInK>0, the processing returns to S703 again to superimpose the remaining gradation value ΔInK on the other multinary colors and the multinary color conversion processing unit 404 sets the available color with the next lowest dot power as the new superimposing target color. In this case, since the remaining gradation value ΔInK=0 in S706, the processing proceeds to S707.

The row of "after processing on InK" in FIG. 8 describes the gradation values of the respective multinary colors after the processing up to this point. The state described in "after processing on InK" can be considered as a state in which K dots are arranged at 3200 pixels positions among all 4095 pixel positions included in a threshold matrix and the other 895 pixels positions are left as white pixels (W).

In S707, the multinary color conversion processing unit 404 determines whether the processing (S702 to S706) for the color of interest is completed for all of black (K), cyan (C), magenta (M), and yellow (Y). If the multinary color conversion processing unit 404 determines that the processing is completed for all colors, this processing is completed. Meanwhile, if a color to be processed is still left, the color of interest is changed to the next color and the processing returns to S702.

In this case, the color of interest is changed to cyan in S708 and the processing returns to S702 again. Then, the multinary color conversion processing unit 404 obtains the gradation value InC=2400 of the newly-set color of interest C.

In subsequent S703, the multinary color conversion processing unit 404 refers to the gradation values at this stage, that is "after processing on InK" and sets a new superimposing target color. Specifically, the multinary color conversion processing unit 404 extracts the available color with the lowest dot power among the available colors that do not include the color of interest C as a component color and whose gradation values are not 0 at this stage in the multinary colors described in the "after processing on InK" of FIG. 8, and sets the extracted available color as the superimposing target color. In this case, W whose gradation value is 895 is set again as the superimposing target color.

In S704, the multinary color conversion processing unit 404 superimposes the color of interest on the superimposing target color W extracted in S703. Specifically, the multinary color conversion processing unit 404 replaces the gradation value of the superimposing target color with as much of the gradation value InK=3200 as possible. In this example, since the gradation value InC=2400 of the color of interest is greater than the gradation value W=895 of the superimposing target color, the gradation value of the superimposing target color is replaced with a portion of the gradation value of the color of interest. As a result, a new gradation value of the superimposing target color W is W=0 and the gradation value of the multinary color C is C=895.

In subsequent S705, the multinary color conversion processing unit 404 calculates the remaining gradation value ΔInC that is a portion of the gradation value InC=2400 of the color of interest not superimposed in the multinary color. In this case, since InC=895 in the gradation value InC=2400 of the color of interest is superimposed on the multinary color W, the remaining gradation value of the color of interest is ΔInC=2400−895=1505.

In S706, the multinary color conversion processing unit 404 determines whether the remaining gradation value ΔInC is 0 or not. In this case, since ΔInC=1505>0, the processing returns to S703. Then, the multinary color conversion processing unit 404 refers to the gradation values of the respective multinary colors described in the row of "after processing on InK" of FIG. 8 again and sets a new superimposing target color. At this stage, K(=3200) is set as the new superimposing target color.

In S704, the multinary color conversion processing unit 404 superimposes the color of interest C on the new superimposing target color K. Specifically, the multinary color conversion processing unit 404 replaces the gradation value of the superimposing target color K with as much of the remaining gradation value ΔInC=1505 of the color of interest as possible. In this example, since the remaining gradation value ΔInC=1505 of the color of interest is smaller than the gradation value K=3200 of the superimposing target color K, the entire gradation value of the color of interest can be used to replace the gradation value of the superimposing target color. Moreover, the multinary color conversion processing unit 404 sets a replaced portion of the gradation value in the gradation value K=3200 of the superimposing target color, as the gradation value of the multinary color (that is, CK) formed by the superimposing of the superimposing target color K and the color of interest C (CK=1505). Meanwhile, a portion of the gradation value of the superimposing target color K that is not replaced is saved as the new gradation value K=K−CK=3200−1505=1695 of the superimposing target color K.

In subsequent S705, the remaining gradation value of the color of interest is ΔInC=0 and the determination result of Yes is obtained in S706. In other words, the processing (S702 to S706) performed with cyan set as the color of interest is completed.

The row of "after processing on InC" in FIG. 8 describes the gradation values of the respective multinary colors after the processing up to this point. The state described in "after processing on InC" can be considered as a state in which C dots are arranged at 895 pixel positions among all 4095 pixel positions included in the threshold matrix, K dots are arranged at 1695 pixels positions, and CK dots (overlapping dots of cyan and black) are arranged at 1505 pixel positions.

Although detailed description is omitted below, the processing is performed in the same steps as those described above also in the case where magenta and yellow are each set as the color of interest.

The row of "after processing on InM" in FIG. 8 describes the gradation values of the respective multinary colors at a stage where the processing performed with magenta set as the color of interest is completed. Moreover, the row of "after processing on InY" describes the gradation values of the respective multinary colors at a stage where the processing performed with yellow set as the color of interest is completed. The state described in the row of "after processing on InY" can be considered as a state in which CM dots are arranged at 415 pixel positions among all 4095 pixel positions included in the threshold matrix, CMY dots are arranged at 480 pixels positions, K dots are arranged at 670 pixel positions, MK dots are arranged at 1025 pixel positions, and CK dots are arranged at 1505 pixel positions.

In the case where the processing performed with yellow set as the color of interest is completed, the multinary color conversion processing unit 404 proceeds to S709 and outputs the gradation values of all multinary colors to the dither processing units 410 and the processing is completed. As described above, the multinary color conversion processing unit 404 of the present embodiment converts the CMYK data of InC=2400, InM=1920, InY=480, and InK=3200 to the multinary color data as described in the row of "after processing on InY".

(Inter-Color Processing)

Next, inter-color processing executed by each of the dither processing units 410 (see FIG. 4) of the present embodiment is described.

Figure 5A:
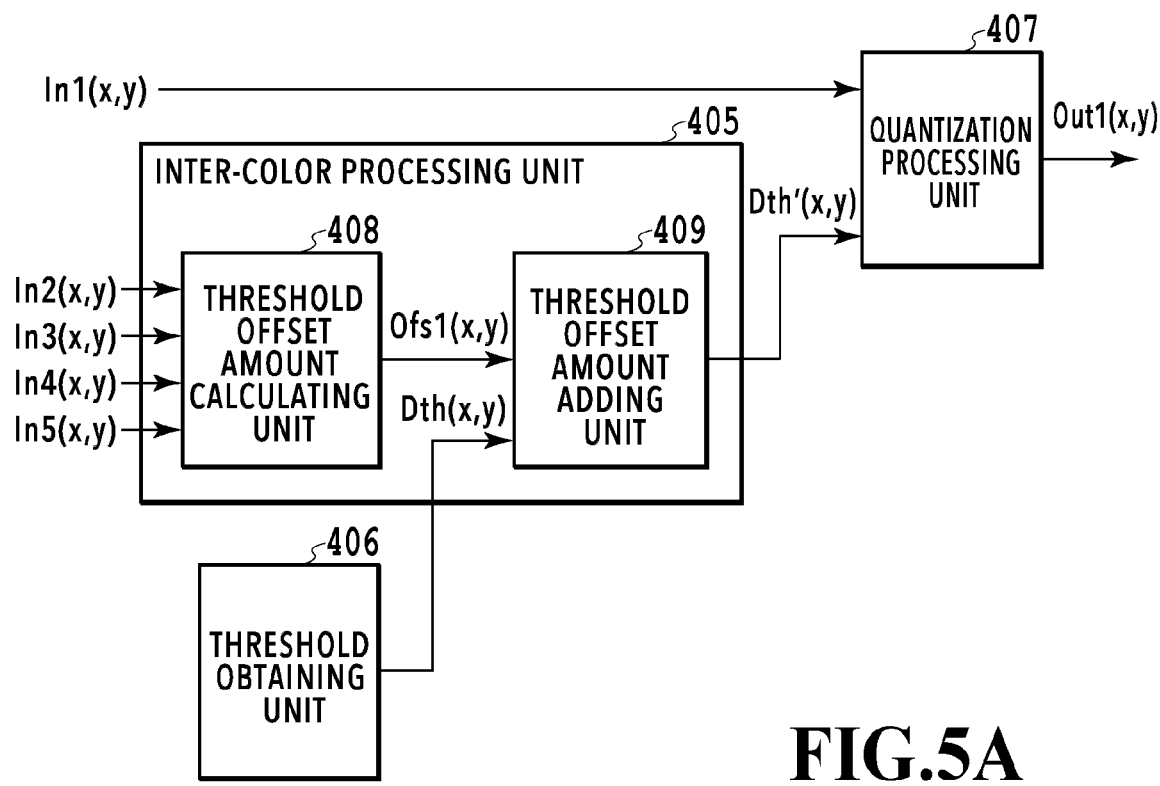
FIGS. 5A and 5B are a block diagram and a flowchart for explaining inter-color processing.
Figure 5B:
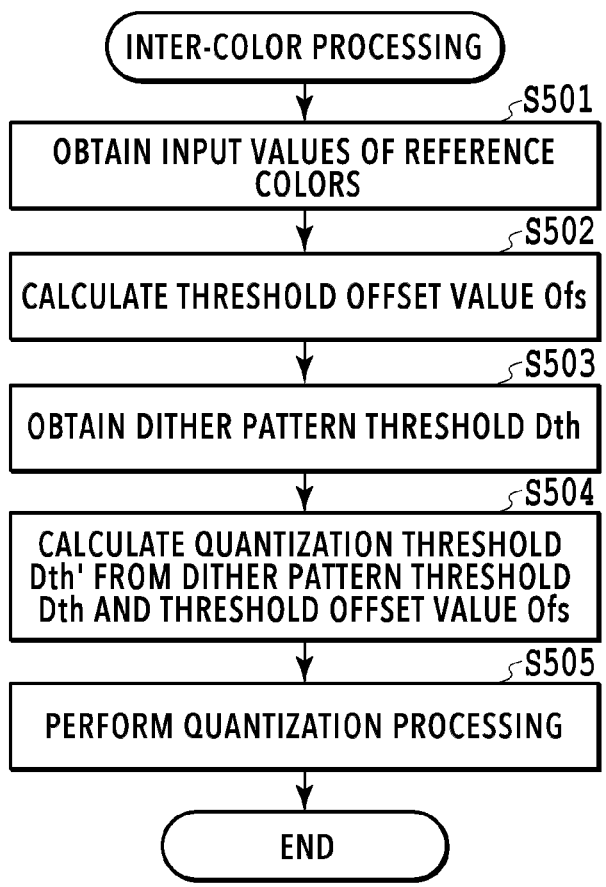

FIGS. 5A and 5B are a block diagram and a flowchart for explaining configurations and steps of processing in the dither processing unit 410. As described above, one dither processing unit 410 is provided to be associated with each of the 15 channels and the quantization processing unit 407 of each dither processing unit 410 receives the gradation value of the multinary color to be processed as the processing target gradation value. Meanwhile, the inter-color processing unit 405 receives the gradation values corresponding to the multinary colors other than the aforementioned processing target color as the reference gradation values. Then, the inter-color processing unit 405 performs predetermined processing on the threshold Dth obtained by the threshold obtaining unit 406 by using these reference gradation values and derives a quantization threshold Dth' for quantization of the processing target gradation value. The quantization processing unit 407 compares the processing target gradation value with the quantization threshold Dth' obtained from the inter-color processing unit 405 to perform quantization processing on the processing target gradation value. For example, if the processing target gradation value is the gradation value of the multinary color K, the reference gradation values are the gradation values of the other 14 multinary colors.

In this section, description is given by using the case where the dither processing unit 410 receives the gradation data in the example illustrated in FIG. 8 from the multinary color conversion processing unit 404 as a specific example. Specifically, it is assumed that the dither processing unit 410 receives the gradation values of CK=1505, MK=1025, K=670, CMY=480, and CM=415 for five colors of CK, MK, K, CMY, and CM and receives the gradation values of 0 uniformly for the other multinary colors. In FIG. 5A, the gradation values of only the aforementioned five colors are illustrated as a first gradation value In1 to a fifth gradation value In5 to simplify the description.

In the present embodiment, the first gradation value to the fifth gradation value (In1 to In5) are set in descending order of dot power. Accordingly, in this example, In1 is set to CK, In2 to MK, In3 to K, In4 to CMY, and In5 to CM.

In FIG. 5A, the processing target gradation value is illustrated as In1(x, y) and the reference gradation values are illustrated as In2(x, y), In3(x, y), In4(x, y), and In5(x, y). In this case, (x, y) indicates the pixel position and is a coordinate parameter used by the threshold obtaining unit 406 to select a threshold for the pixel position of the processing target gradation value from the threshold matrix.

As illustrated in FIG. 5A, the reference gradation values In2(x, y). In3(x, y), In4(x, y), and In5(x, y) inputted into the inter-color processing unit 405 are first inputted into a threshold offset amount calculating unit 408 (S501). Then, the threshold offset amount calculating unit 408 calculates a threshold offset value Ofs1(x, y) for the processing target gradation value In1(x, y) by using the inputted reference gradation values (S502). Although only the example in which the threshold offset value Ofs1(x, y) for the processing target gradation value In1(x, y) is obtained is described in FIG. 5A, threshold offset values Ofs1 to Ofs5 respectively for the five processing target gradation values In1 to In5 are obtained in the respective channels. In the channels, the threshold offset values Ofs1(x, y) to Ofs5(x, y) are obtained by using the following formulae.

$$Ofs1(x,y)=0 \qquad \text{(Formula 1-1)}$$

$$Ofs2(x,y)=In1(x,y) \qquad \text{(Formula 1-2)}$$

$$Ofs3(x,y)=In1(x,y)+In2(x,y) \qquad \text{(Formula 1-3)}$$

$$Ofs4(x,y)=In1(x,y)+In2(x,y)+In3(x,y) \qquad \text{(Formula 1-4)}$$

$$Ofs5(x,y)=In1(x,y)+In2(x,y)+In3(x,y)+In4(x,y) \qquad \text{(Formula 1-5)}$$

The calculated threshold offset values Ofs1(x, y) to Ofs5 (x, y) are inputted into threshold offset amount adding units 409 in the respective channels. Since the following processing is the same in all channels, description is given by using In(x, y) and Ofs(x, y) as common references symbols respectively for the processing target gradation value and the threshold offset value.

Each threshold offset amount adding unit 409 obtains the threshold Dth (x, y) for the processing target gradation value In(x, y) at coordinates (x, y) from the threshold obtaining unit 406 (S503).

In S504, the threshold offset amount adding unit 409 subtracts the threshold offset value Ofs(x, y) received from the threshold offset amount calculating unit 408 from the threshold Dth(x, y) received from the threshold obtaining unit 406 to obtain the quantization threshold Dth'(x, y).

$$Dth'(x,y)=Dth(x,y)-Ofs(x,y) \quad \text{(Formula 2)}$$

In this case, if Dth'(x, y) takes a negative value, the threshold offset amount adding unit 409 adds the maximum value Dth_max (hereafter referred to as maximum threshold) of the thresholds included in the dither pattern to Dth'(x, y) and sets the obtained value as the quantization threshold Dth'(x, y).

Specifically,
in the case of Dth'(x, y)<0, $$Dth'(x,y)=Dth'(x,y)+Dth\_max \quad \text{(Formula 3)}$$

The value which the quantization threshold Dth'(x, y) can take is thus within a range of 0≤Dth'(x, y)≤Dth_max.

In the case where the quantization threshold Dth'(x, y) is obtained by using (Formula 2) or (Formula 3), the quantization processing unit 407 compares the quantization threshold Dth'(x, y) with the processing target gradation value In(x, y). Then, the quantization processing unit 407 generates a quantized value Out(x, y) expressing printing (1) or non-printing (0) for the pixel position (x, y) which is the processing target based on the result of the comparison (S505). This processing is thus completed.

Figure 9A:
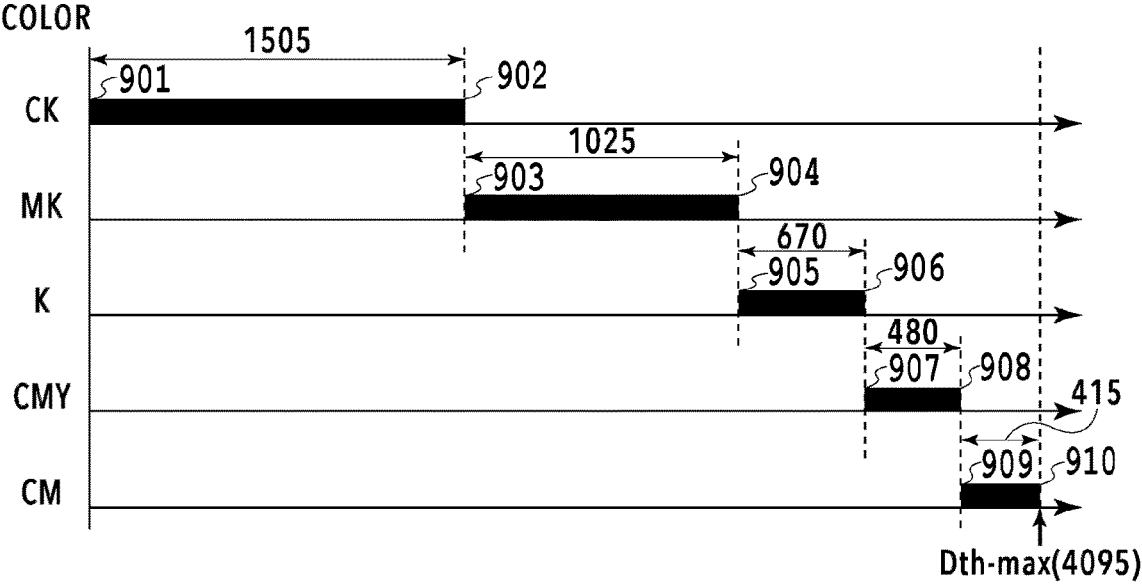
FIGS. 9A and 9B are graphs illustrating results of quantization in the first embodiment.
Figure 9B:
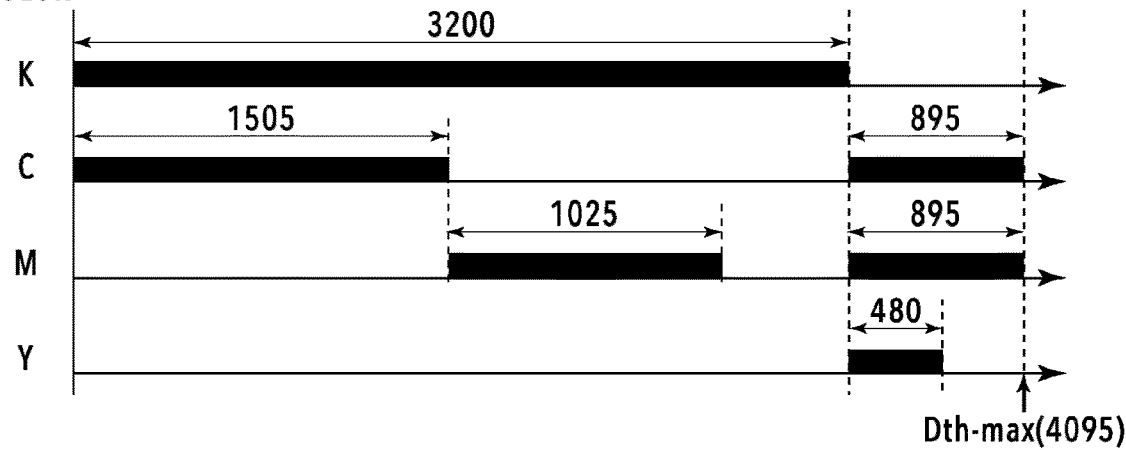

FIGS. 9A and 9B are graphs illustrating threshold ranges in which determination of printing (1) is made in thresholds 0 to Dth_max arranged in the threshold matrix in the case where the same gradation value are uniformly inputted for pixels in a predetermined pixel region. The horizontal axis represents the threshold Dth and illustrates the range from 0 to Dth_max (maximum threshold 4095). Bold lines corresponding to the respective colors illustrate the threshold ranges in which determination of printing (1) is made.

FIGS. 9A and 9B illustrate quantization results in the case where the multinary color conversion processing unit 404 receives gradation value data having gradation values of InC=2400, InM=1920, InY=480, and InK=3200 uniformly for the predetermined pixel region from the normalization processing unit 403 as described above as the specific example. FIG. 9A illustrates a result of the aforementioned inter-color processing of the present embodiment for each multinary color.

In the present embodiment, the multinary color conversion processing unit 404 converts the gradation values of InC=2400, InM=1920, InY=480, and InK=3200 to gradation values of the multinary colors illustrated in FIG. 8. Specifically, the gradation values of InC=2400, InM=1920, InY=480, and InK=3200 are converted to a gradation value In1=1505 of a first color (CK), a gradation value In2=1025 of a second color (MK), a gradation value In3=670 of a third color (K), a gradation value In4=480 of a fourth color (CMY), and a gradation value In5=415 of a fifth color (CM).

In this case, for the first color (CK). Ofs1=0 based on (Formula 1-1). Accordingly, quantized values Out(x, y) for pixel positions corresponding to 1505 thresholds included in a range of 0 to In1-1=1504 (901 to 902) are set to printing (1).

For the second color (MK), Ofs2=In1=1505 based on (Formula 1-2). Accordingly, quantized values Out(x, y) for pixel positions corresponding to 1025 thresholds included in a range of In1=1505 to In1+In2-1=2529 (903 to 904) are set to printing (1).

For the third color (K). Ofs3=In1+In2=1505+1025=2530 based on (Formula 1-3). Accordingly, quantized values Out(x, y) for pixel positions corresponding to 670 thresholds included in a range of In1+In2=2530 to In1+In2+In3-1=3199 (905 to 906) are set to printing (1).

For the fourth color (CMY), Ofs4=In1+In2+In3=1505+1025+670=3200 based on (Formula 1-4). Accordingly, quantized values Out(x, y) for pixel positions corresponding to 480 thresholds included in a range of In1+In2+In3=3200 to In1+In2+In3+In4-1=3679 (907 to 908) are set to printing (1).

For the fifth color (CM), Ofs5=In1+In2+In3+In5=1505+1025+670+480=3680 based on (Formula 1-5). Accordingly, quantized values Out(x, y) for pixel positions corresponding to 415 thresholds included in a range of In1+In2+In3+In4=3680 to In1+In2+In3+In4+In5-1=4094 (909 to Dth_max) are set to printing (1).

Meanwhile, FIG. 9B is a graph illustrating the results illustrated in FIG. 9A for the respective ink colors. Specifically, the results in FIG. 9B correspond to results obtained in the case where the multinary color integration processing unit 411 integrates the gradation values of the multinary colors obtained by the dither processing units 410 of the respective channels.

Figure 10A:
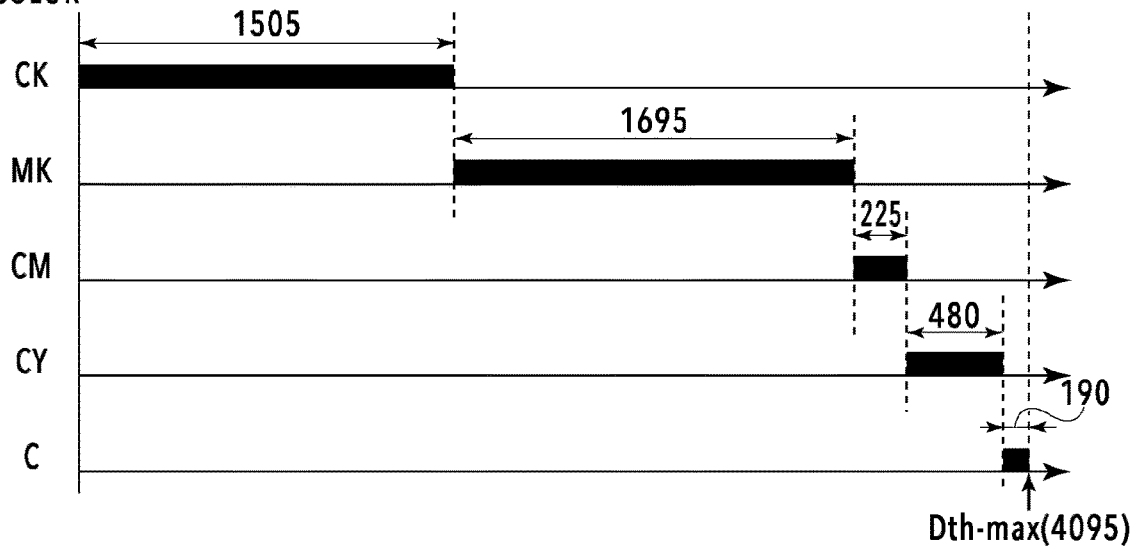
FIGS. 10A and 10B are graphs illustrating results of quantization as a comparative example of the first embodiment.
Figure 10B:
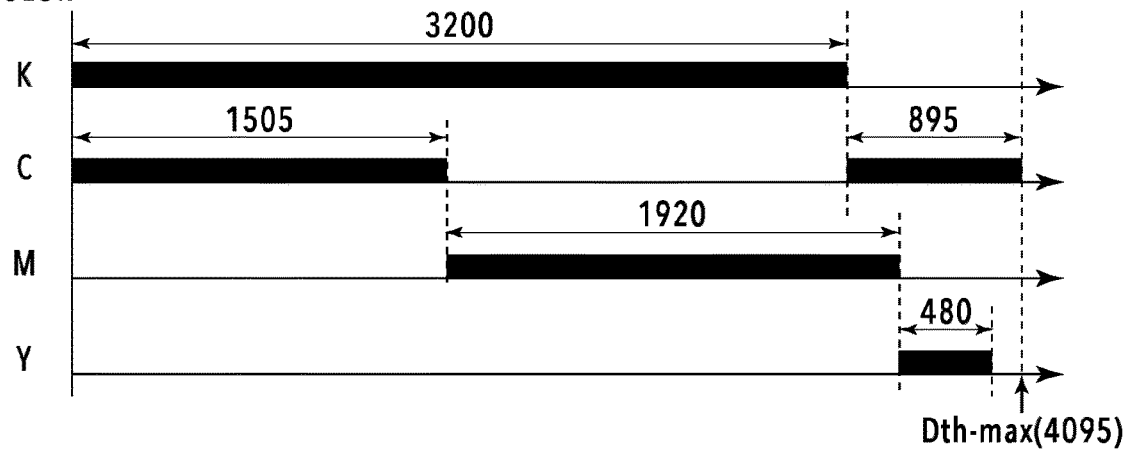

FIGS. 10A and 10B are graphs illustrating results, obtained in the case where the same received gradation data as that in FIGS. 9A and 9B is subjected to general inter-color processing, as in FIGS. 9A and 9B. Specifically, FIGS. 10A and 10B illustrate results obtained in the case where the inter-color processing is performed on InC=2400, InM=1920, InY=480, and InK=3200 outputted from the normalization processing unit 403 with the first color being InK, the second color being InC, the third color being InM, and the fourth color being InY. FIG. 10A illustrates results for the respective multinary colors and FIG. 10B illustrates results for the respective ink colors.

In this comparative example, five colors of CK, MK, CM. CY, and C are used as the multinary colors. In comparison to the present embodiment illustrated in FIGS. 9A and 9B, K and CMY are eliminated and CY and C with lower dot powers are added as the multinary colors to be actually used.

Specifically, the present embodiment can reduce a difference in dot power between the used multinary colors from that in the comparative example and make the difference in dot power (lightness difference) between the multinary colors less obvious. In addition, in the present embodiment, dots can be arranged at the pixel positions corresponding to the consecutive thresholds from the minimum value 0, in descending order of dot power, as illustrated in FIG. 9A. As described above, in the case where a threshold matrix having a blue noise characteristic is used as the dither pattern, a preferable blue noise characteristic can be obtained by arranging dots at pixel positions corresponding to consecutive thresholds from the minimum value 0. In other words, the inter-color processing of the present embodiment enables output of a uniform and smooth high-quality image with lower graininess than that in conventional techniques.

Second Embodiment

Also in the present embodiment, the image processing is performed in the steps illustrated in FIG. 3 by using the printing apparatus 100 and the image processing apparatus 200 illustrated in FIGS. 1A to 2 as in the first embodiment. Note that the print head 102 of the present embodiment is assumed to be capable of ejecting inks of five colors in total including a green (G) ink as a particular color ink in addition to black (K), cyan (C), magenta (M), and yellow (Y) described in the first embodiment. Although the case where the green (G) ink is added is described as an example in this section, a red ink or a blue ink can be used as the particular color ink. Moreover, pale color inks such as a gray ink, a light cyan ink, and a light magenta ink with higher lightness than the black, cyan, and magenta inks can be also used.

FIG. 6B is a table illustrating types of multinary colors in the present embodiment. The number of multinary colors is increased from that in the first embodiment due to addition of green (G) and there are total of 32 colors.

FIG. 11 is a table for specifically explaining steps of conversion processing executed by the multinary color conversion processing unit 404 of the present embodiment. As in FIG. 8, the 32 types of multinary colors are arranged in ascending order of dot power from left to right.

FIG. 11 illustrates steps of the multinary color conversion processing in the case where a cyan gradation value InC=2400, a magenta gradation value InM=1280, a yellow gradation value InY=0, a black gradation value InK=0, and a green gradation value InG=2400 are inputted. The multinary color conversion processing unit 404 of the present embodiment also performs the multinary color conversion processing according to the flowchart illustrated in FIG. 7. In this case, the order of setting the color of interest is the descending order of dot power, specifically, in order of black, green, cyan, magenta, and yellow. As a result, the gradation values illustrated in the row of "after processing on InM" in FIG. 11 are eventually obtained. Specifically, the dither processing units 410 of the present embodiment receive gradation values of CM=1280, CG=545, G=1855, and C=415 for four colors of CM, CG, G, and C and receive gradation values of 0 uniformly for the other multinary colors.

Figure 12A:
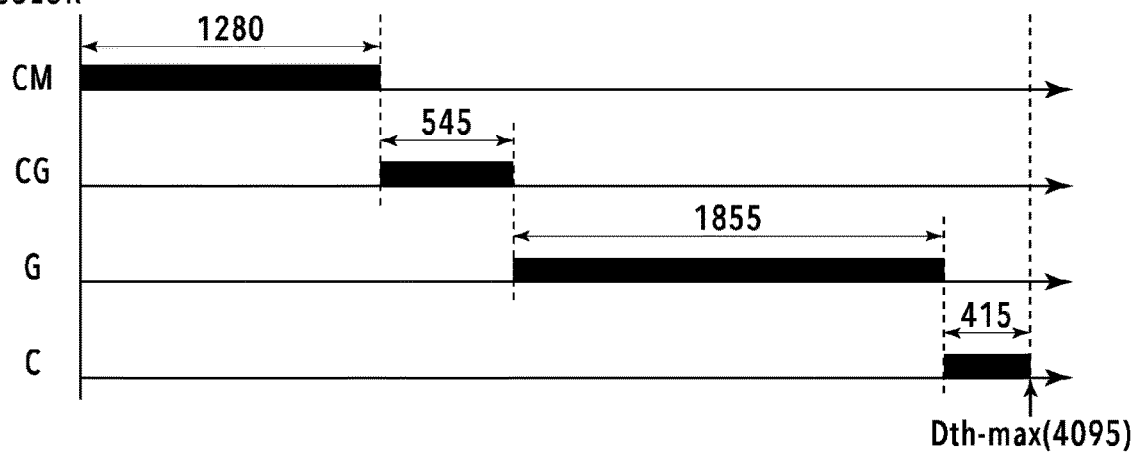
FIGS. 12A and 12B are graphs illustrating results of quantization in the second embodiment.
Figure 12B:
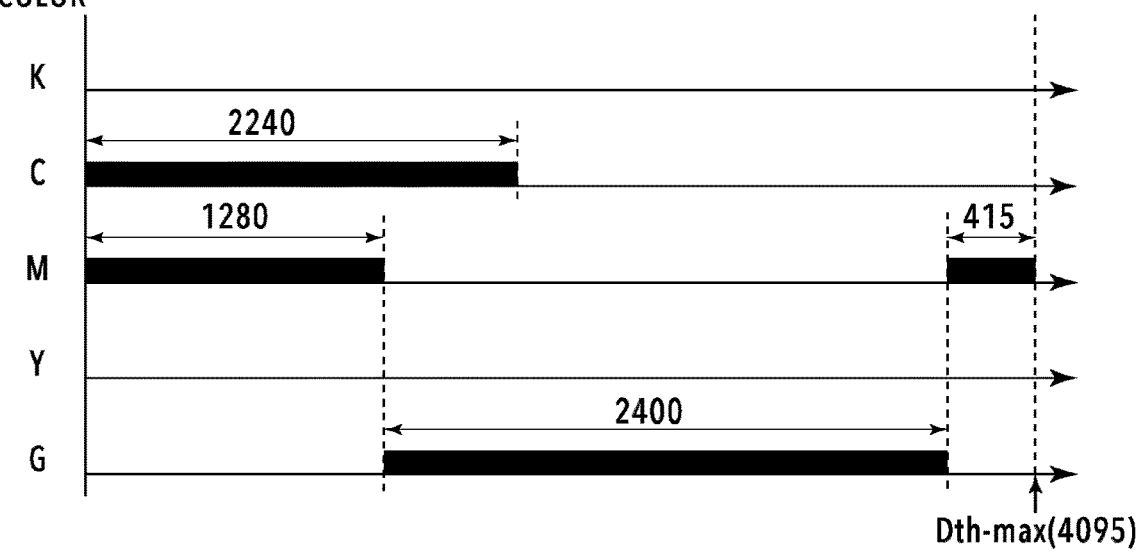
Figure 13A:
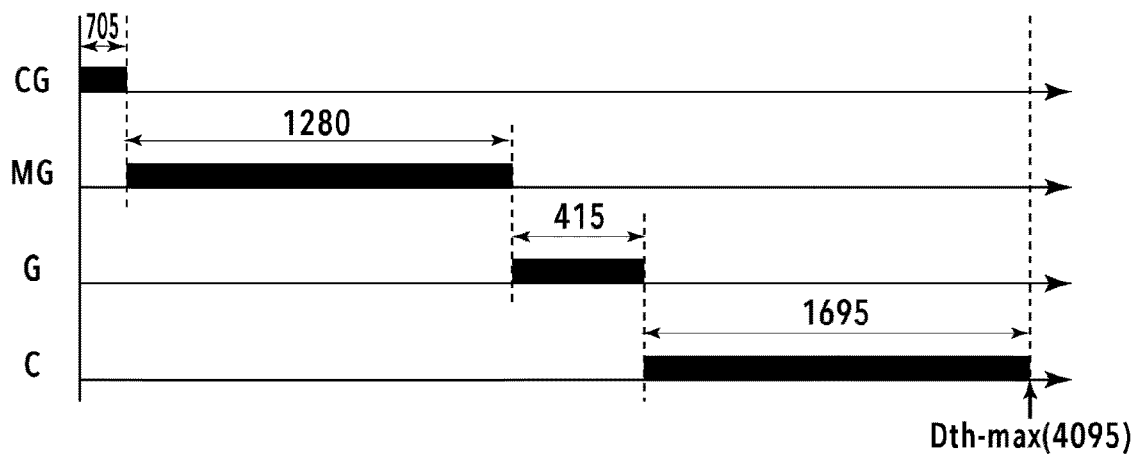
FIGS. 13A and 13B are graphs illustrating results of quantization as a comparative example of the second embodiment.
Figure 13B:
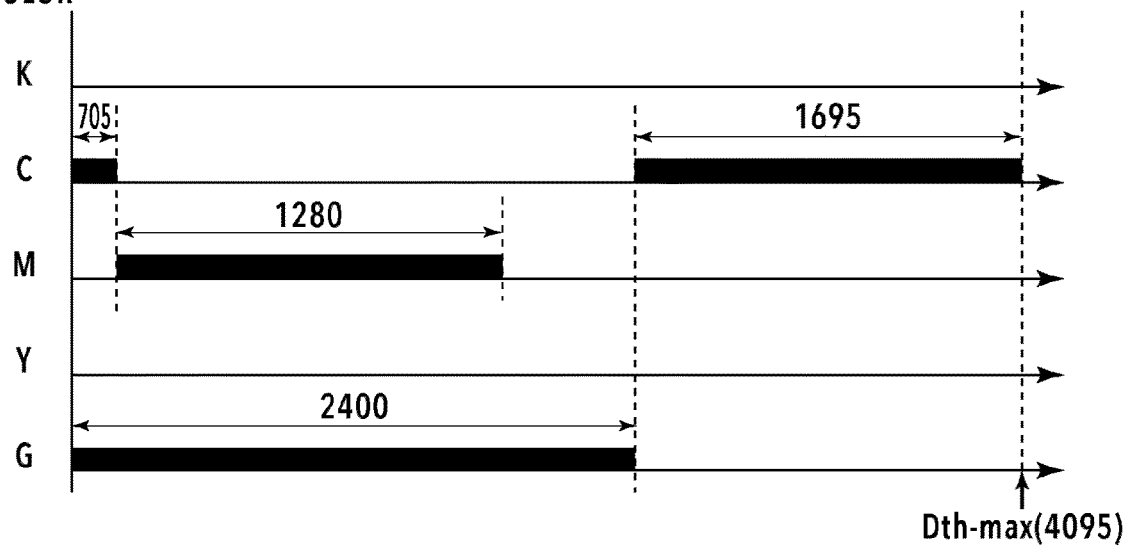

FIGS. 12A and 12B are graphs illustrating results of the inter-color processing in the present embodiment, as in FIGS. 9A and 9B. Moreover, FIGS. 13A and 13B are a comparative example illustrating results, obtained in the case where the same received gradation data as that in FIGS. 12A and 12B is subjected to general inter-color processing, as in FIGS. 12A and 12B. The order of the inter-color processing in the comparative example is the descending order of dot power. Specifically, FIGS. 13A and 13B illustrate results obtained in the case where the inter-color processing is performed with the first color being InK, the second color being InG, the third color being InC, the fourth color being InM, and the fifth color being InY.

In the present embodiment, CM, CG, G, and C are used as the multinary colors as illustrated in FIG. 12A. Moreover, the dots are arranged at the pixel positions corresponding to the consecutive thresholds from the minimum value 0, in descending order of dot power described above. Meanwhile, in the comparative example, CG, MG, G, and C are used as the multinary colors. Then, the dots are arranged in the order described above.

In the comparative example, the CM is eliminated and MG with a higher dot power is added as the multinary color in comparison to the present embodiment. Specifically, in the comparative example, a difference in lightness between the white region of the print medium and the multinary color with the lowest lightness among the used multinary colors is greater than that in the present embodiment and the graininess is more obvious. Moreover, in the comparative example, the order of the multinary colors in the arrangement of the dots at the pixel positions corresponding to the consecutive thresholds from the minimum value 0, that is the order of CG, MG, G, and C is not the descending order of dot power (MG, CG, G, and C). Accordingly, in the comparative example, there is a risk that effects of the blue noise characteristic cannot be sufficiently obtained compared to the present embodiment.

Specifically, in the present embodiment, performing the inter-color processing in descending order of dot power of the multinary color can suppress graininess and enables output of a uniform and smooth high-quality image also in the case w % here the inks include the specific color ink.

Third Embodiment

Also in the present embodiment, the image processing is performed in the steps illustrated in FIG. 3 by using the printing apparatus 100 and the image processing apparatus 200 described in FIGS. 1A to 2 as in the first embodiment. Note that the print head 102 of the present embodiment is assumed to have a nozzle row capable of forming large dots on the print medium by ejecting a relatively large amount of ink and a nozzle row capable of forming small dots on the print medium by ejecting a relatively small amount of ink for each of cyan and magenta.

In the ink color separation processing (S302 of FIG. 3) of the present embodiment, the CPU 201 converts the R'G'B' data to CcMmYK data indicating gradation values of large cyan (C), small cyan (c), large magenta (M), small magenta (m), yellow (Y), and black (K). Moreover, the multi color conversion processing unit 404 illustrated in FIG. 4 converts the CcMmYK data subjected to the normalization to 64 types (2 to the sixth power) of multinary color data.

FIG. 14 is a table for specifically explaining steps of conversion processing executed by the multinary color conversion processing unit 404 of the present embodiment. FIG. 14 illustrates an example of processing in the case where the received gradation values of the respective colors are InC=1600, InM=1920, InY=1440, InK=0, Inc=960, and Inm=480. Although 64 multinary colors are handled in the present embodiment, multinary colors relating to K whose received gradation values are 0 and multinary colors of tertiary colors or higher whose gradation values resultantly become 0 are omitted in the illustration of FIG. 14 to simplify the explanation. Moreover, in the present embodiment, multinary colors (Cc, Mm) obtained by combining color elements of the same color and different sizes such as a set of large cyan and small cyan and a set of large magenta and small magenta are assumed to be not generated. In view of above, FIG. 14 illustrates the multinary colors arranged in ascending order of dot power from left to right as in FIG. 8.

The multinary color conversion processing unit 404 of the present embodiment also performs the multinary color conversion processing according to the flowchart illustrated in FIG. 7 while setting the color of interest in descending order of dot power. As a result, the gradation values illustrated in the row of "after processing on InY" in FIG. 14 are obtained. Specifically, the dither processing units 410 of the present embodiment receive gradation values of cM=385, MY=1345, cm=480, cY=95, C=1600, and M=190. Moreover, the dither processing units 410 receive gradation values of 0 uniformly for the other multinary colors.

Focusing on the multinary colors cM and cm, these two multinary colors vary in dot power but are common in that they express a blue color in which the cyan ink and the magenta ink are present in a mixed manner. In the present embodiment, the inter-color processing is performed successively for such multinary colors expressing similar colors.

Specific description is given below. For example, in the case where the inter-color processing is performed in descending order of dot power, the first color is cM, the second color is MY, and the third color is cm. In this case, MY is set between cM and cm for the consecutive thresholds from the minimum value 0 and cM and cm having similar hues are discontinuous. Then, this discontinuity sometimes makes the graininess of the blue dots obvious. Meanwhile, in the present embodiment, the first color is cM, the second color is cm, and the third color is MY in the inter-color processing. This maintains the continuity between cM and cm having similar hues.

Figure 15A:
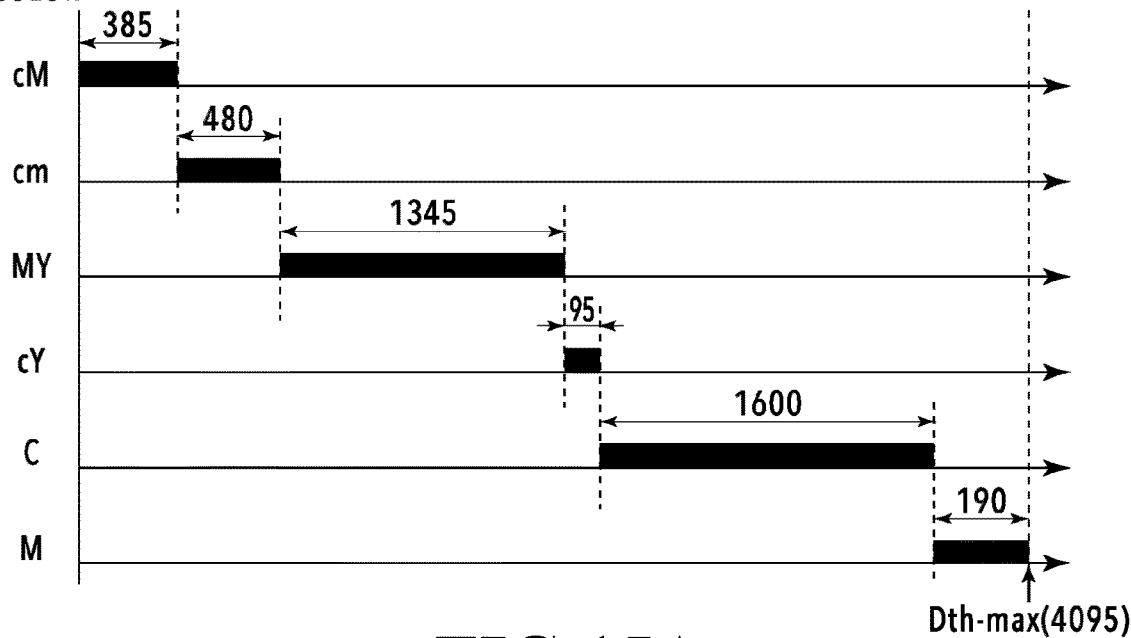
FIGS. 15A and 15B are graphs illustrating results of quantization in the third embodiment.
Figure 15B:
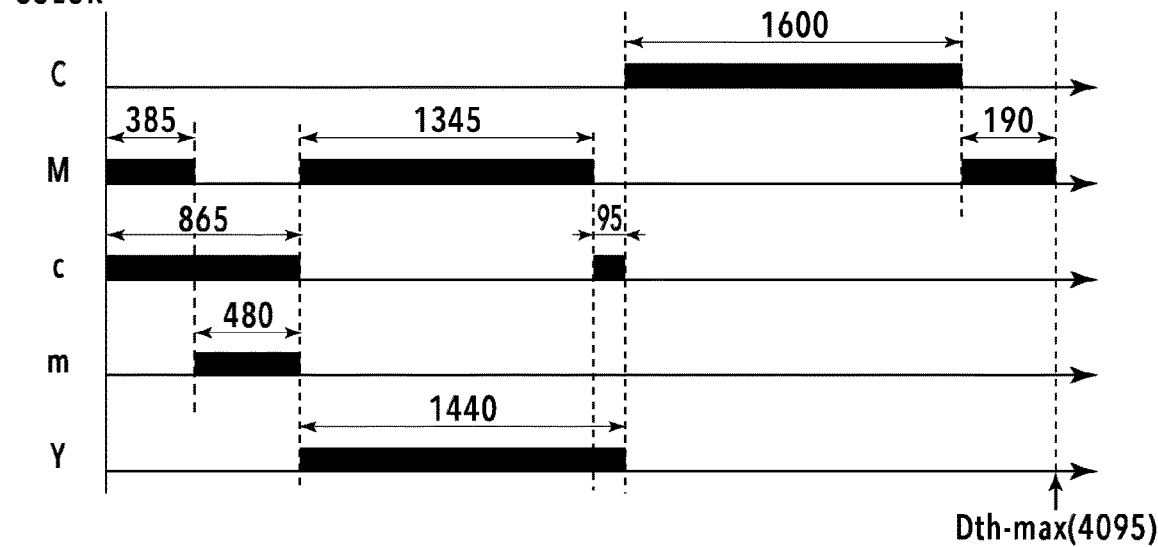

FIGS. 15A and 15B are graphs illustrating results of the inter-color processing in the present embodiment, as in FIGS. 9A and 9B. As apparent from FIGS. 15A and 15B, in the case of the present embodiment, the dots are arranged at the pixels positions corresponding to the consecutive thresholds from the minimum value 0, in order of cM, cm, MY, cY, C, and M. Specifically, in the present embodiment, blue dots of similar colors are arranged at the pixel positions corresponding to the consecutive thresholds from the minimum value 0 in the threshold matrix and the blue dots as a whole can have a preferable blue noise characteristic. As a result, it is possible suppress graininess in the entire image.

Although the large dot and the small dot are used as dots of the similar color inks varying in dot power, the present embodiment can be also applied to a configuration using dark and pale inks. For example, also in the case where the printing apparatus uses inks of similar colors varying in the density of a contained color material such as a set of the cyan ink and the light cyan ink and a set of the magenta ink and the light magenta ink, the effects of the present embodiment can be obtained by performing the same processing as that described above.

Fourth Embodiment

Also in the present embodiment, the image processing is performed in the steps illustrated in FIG. 3 by using the printing apparatus 100 and the image processing apparatus 200 described in FIGS. 1A to 2 as in the first embodiment. Note that the print head 102 of the present embodiment is assumed to be capable of ejecting inks of five colors in total including a gray (Gr) ink in addition to black (K), cyan (C), magenta (M), and yellow (Y) described in the first embodiment. In this case, the gray ink is assumed to have a lower dot power than black (K) and a higher dot power than cyan.

In the inter-color processing of the present embodiment, two different threshold matrices are prepared for the aforementioned inks of five colors and two lines of inter-color processing are performed. Specifically, first inter-color processing using a first threshold matrix is performed for black, cyan, and gray with relatively high dot powers. Meanwhile, second inter-color processing using a second threshold matrix is performed for magenta and yellow with relatively low dot powers.

Inter-color processing similar to that in the first embodiment is performed in both of the first inter-color processing and the second inter-color processing. Specifically, in the first inter-color processing, the multinary color conversion processing unit 404 (see FIG. 4) converts the gradation values of black (K), cyan (C), and gray (Gr) to gradation values of seven types (2 cubed minus 1) of multinary colors.

Then, the inter-color processing using the first threshold matrix is performed for the obtained multinary colors in descending order of dot power. Moreover, in the second inter-color processing, the multinary color conversion processing unit 404 (see FIG. 4) converts the gradation values of magenta (M) and yellow (Y) to gradation values of three types (2 squared minus 1) of multinary colors. Then, the inter-color processing using the second threshold matrix is performed for the obtained multinary colors in descending order of dot power.

Figure 16A:
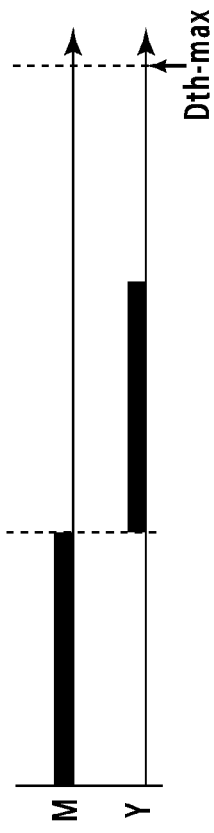
FIGS. 16A to 16D are graphs illustrating results of quantization in a fourth embodiment.
Figure 16C:
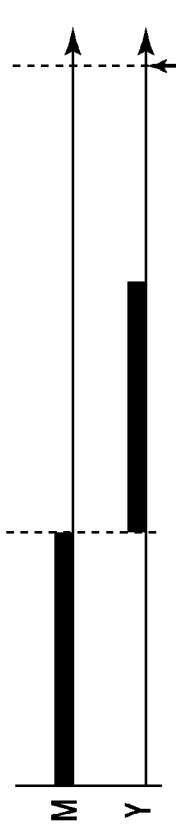
Figure 16B:
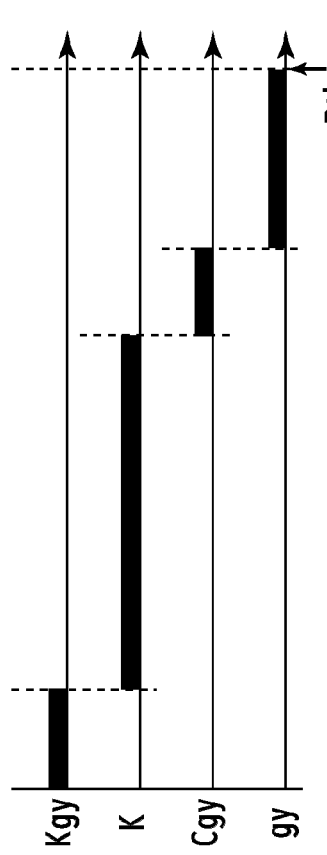
Figure 16D:
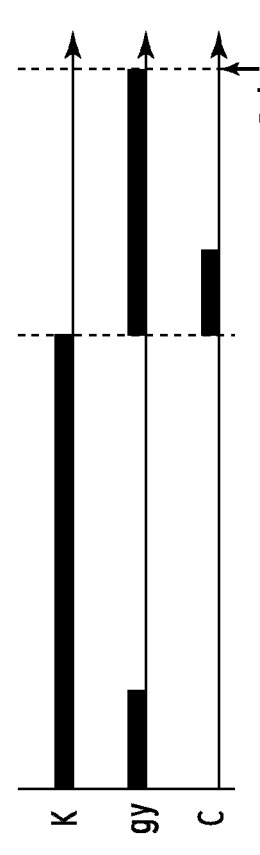

FIGS. 16A and 16D are graphs illustrating results of the inter-color processing of the present embodiment as in FIGS. 9A and 9B. FIGS. 16A and 16B illustrate results of the first inter-color processing and FIGS. 16C and 16D illustrate results of the second inter-color processing.

In both of the first inter-color processing and the second inter-color processing, the dots can be arranged at the pixel positions corresponding the consecutive thresholds from the minimum value 0 in each of the threshold matrices for the first inter-color processing and the second inter-color processing, in descending order of dot power. Since the overlapping of the dots is not controlled between the first inter-color processing and the second inter-color processing, the graininess tends to be more obvious in the present embodiment than in the first embodiment in which the dots are arranged in descending order of dot power for all multinary colors. However, in the present embodiment, the colors are divided into a group of colors particularly having a large effect on the graininess, that is colors with relatively high dot powers and a group of the other colors and the processing similar to that in the first embodiment is performed on each of these groups. Accordingly, in the outputted image, dots that have low dot powers and are visually less obvious are laid on a dot pattern in which dots that have high dot powers and are more obvious are arranged with high dispersity. Specifically, the graininess is not sensed to have become greatly poorer from that in the first embodiment.

Meanwhile, although the number of multinary colors for the inks of five colors is 32 (2 to the 5th power) in total, in the present embodiment, processing can be performed for a group of eight colors (2 cubed) and a group of four colors (2 squared), that is 12 colors in total. In other words, in the present embodiment, it is possible to greatly reduce processing load and improve processing speed from those in the first embodiment without making the graininess greatly poorer from that in the first embodiment.

Fifth Embodiment

Also in the present embodiment, as in the first embodiment, image processing is performed in the steps illustrated in FIG. 3 by using the printing apparatus 100 and the image processing apparatus 200 illustrated in FIGS. 1A to 2. However, the dither processing unit 410 of the present embodiment quantizes the gradation values In1 to In4 of the respective colors to three-level values expressed in three levels of level 0 to level 2, instead of the values of two levels of printing (1) and non-printing (0). Specifically, the level 2 indicates printing of two dots, the level 1 indicates printing of one dot, and the level 0 indicates printing of no dot for each ink color.

The quantization processing of the present embodiment is described with reference to the block diagram of FIG. 4 again. The normalization processing unit 403 of the present embodiment normalizes the 16-bit gradation values to which noise is added into a 13-bit range. Specifically, the normalization processing unit 403 doubles the gradation value of each pixel expressed in 16 bits and then divides the doubled gradation value by 16 to obtain a 13-bit gradation value. The normalization processing unit 403 of the present embodiment thus converts the 65535-level gradation values expressed in 16 bits into 8192-level values expressed in 13 bits. Then, the gradation values of the four colors of cyan, magenta, yellow, and black are inputted into the dither processing units 410 of the respective four channels.

A case where the normalization processing unit 403 receives 16-bit gradation values of InC=36736, InM=0, InY=0, and InK=40832 is described below as an example. In this case, the 13-bit gradation values after the normalization are InC=4592, InM=0, InY=0, and InK=5104.

FIG. 17 is a table for specifically explaining steps of the conversion processing in the present embodiment in the case where the aforementioned gradation values are inputted. In the present embodiment, since the levels 0 to 2 of each color are handled as different color elements, total of 81 (3 to the 4th power) multinary colors are used. However, in FIG. 17, illustration of multinary colors relating to M and Y whose received gradation values are 0 is omitted to simplify the description. Moreover, in FIG. 17, the multinary colors are illustrated to be arranged in ascending order of dot power from left to right in the aforementioned conditions.

The multi-dimension conversion processing executed by the multi color conversion processing unit 404 of the present embodiment is described below with reference to the flowchart of FIG. 7 again. In the case where this processing is started, the multinary color conversion processing unit 404 first performs initialization processing in S701. Specifically, as illustrated in the row of "initial value" in FIG. 17, the multinary color conversion processing unit 404 sets the gradation value W of W (white) to the maximum value 4095 and sets the gradation values of the other multinary colors to 0. Moreover, the multinary color conversion processing unit 404 sets black (K) among the four colors corresponding to the received gradation values InK, InC, InM, and InY, as the color of interest.

In S702, the multinary color conversion processing unit 404 obtains the received gradation value of the color of interest. In this case, InK=5104 is obtained.

In S703, the multinary color conversion processing unit 404 extracts the available color with the lowest dot power among all multinary colors and sets the extracted available color as the superimposing target color. In this case, W is set as the superimposing target color.

In S704, the multinary color conversion processing unit 404 superimposes the color of interest on the superimposing target color set in S703. In this example, since the gradation value InK=5104 of the color of interest is greater than the gradation value W=4095 of the superimposing target color, the gradation value of the superimposing target color is replaced with a portion of the gradation value of the color of interest. Then, the multinary color conversion processing unit 404 sets the replaced portion of the gradation value as a gradation value of a multinary color (that is, K) formed by the superimposing of the superimposing target color W (white) and the color of interest K (K=4095). Meanwhile, the gradation value W=4095 of the superimposing target color is updated to W=0.

In S705, the multinary color conversion processing unit 404 calculates the remaining gradation value ΔInK that is a portion of the gradation value InK=5104 of the color of interest not superimposed in the multinary color. In this example, ΔInK=5104−4095=1009.

In S706, the multinary color conversion processing unit 404 determines whether the remaining gradation value ΔInK is 0 or not. In this case, since ΔInK>0, the processing returns to S703. Then, the multinary color conversion processing unit 404 sets the available color with the next lowest dot power among the multiple multinary colors as a new superimposing target color. In this case, K is set as the superimposing target color.

In subsequent S704, the multinary color conversion processing unit 404 superimposes the color of interest on the superimposing target color K set in S703. In this case, since ΔInK=1009 is smaller than the gradation value K=3086 of the superimposing target color, the entire remaining gradation value ΔInK is used to replace the gradation value of the superimposing target color K. Then, the replaced portion of the gradation value is set as a gradation value of a multinary color (that is, KK) formed by the superimposing of the superimposing target color K and the color of interest K (KK=1009). Meanwhile, a portion of the gradation value K=4095 of the superimposing target color that is not replaced is saved as the new gradation value K=K−KK=4095−1009=3086 of the superimposing target color.

The row of "after processing on InK" in FIG. 17 describes the gradation values of the respective multinary colors after the processing up to this point. The state described in "after processing on InK" can be considered as a state in which K dots are arranged at 3086 pixel positions among all 4095 pixel positions included in the threshold matrix and KK dots (overlapping dots of K) are arranged at the other 1009 pixels positions.

In S705, the multinary color conversion processing unit 404 calculates the remaining gradation value ΔInK that is a portion of the remaining gradation value ΔInK of the color of interest not superimposed in the multinary color. In this case, since ΔInK=0, the multinary color conversion processing unit 404 changes the color of interest to cyan in S708 and then returns to S702. Then, the multinary color conversion processing unit 404 obtains the gradation value InC=4592 of the newly-set color of interest C.

In subsequent S703, the multinary color conversion processing unit 404 refers to the gradation value at this stage, that is "after processing on InK" and sets a new superimposing target color. Specifically, the multinary color conversion processing unit 404 extracts the available color with the lowest dot power among the available colors whose gradation values are not 0 in the multinary colors described in the "after processing on InK" of FIG. 17, and sets the extracted available color as the superimposing target color. In this case, K having the gradation value of 3086 is set again as the superimposing target color.

In S704, the multinary color conversion processing unit 404 superimposes the color of interest on the superimposing target color K set in S703. Specifically, the multinary color conversion processing unit 404 replaces the gradation value of the superimposing target color with as much of the gradation value InC=4592 as possible. In this example, since the gradation value InC=4592 of the color of interest is greater than the gradation value K=3086 of the superimposing target color, the gradation value of the superimposing target color is replaced with a portion of the gradation value InC. Specifically, a gradation value CK=3086 of the multinary color CK is newly set and the gradation value of the superimposing target color K is updated to K=0.

In subsequent S705, the remaining gradation value ΔInC=InC−CK=4592−3086=1506 is calculated, determination of No is made in S706, and the processing returns to S703 again. Then, the multinary color conversion processing unit 404 sets the available color with the next lowest dot power among the multiple multinary colors as a new superimposing target color. In this case, CK is set as the superimposing target color.

In subsequent S704, the multinary color conversion processing unit 404 superimposes the remaining gradation value ΔInC on the superimposing target color CK set in S703. As a result, CCK=1506 and CK=3086−1506=1580. At this stage, ΔInC=0 (S705) and this processing is completed.

The row of "after processing on InC" in FIG. 17 describes the gradation values of the respective multinary colors after the execution of the multinary color conversion processing of the present embodiment. The state described herein can be considered as a state in which KK dots (overlapping dots of K and K) are arranged at 1009 pixel positions among all 4095 pixel positions, CCK dots (overlapping dots of C, C, and K) are arranged at 1506 pixel positions, and CK dots (overlapping dots of C and K) are arranged at 1580 pixel positions.

The dither processing units 410 of the present embodiment receive the multinary color data for total of 80 colors other than W among the aforementioned colors and execute the inter-color processing similar to those in the aforementioned embodiments.

Figure 18A:
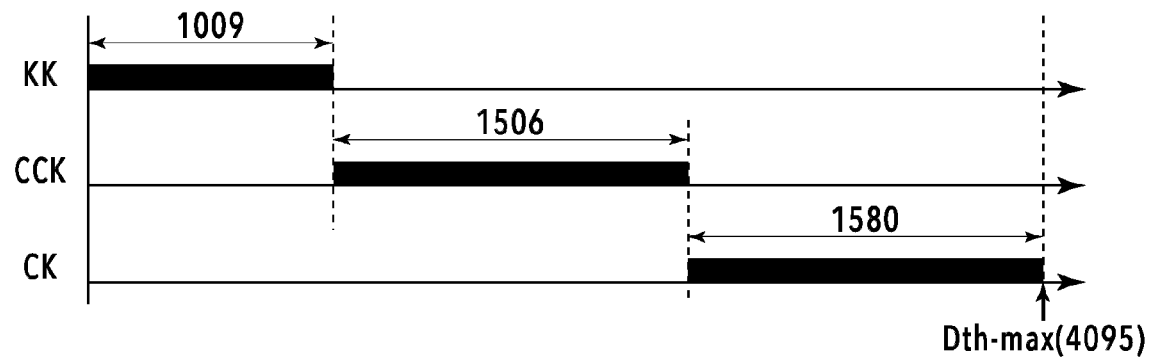
FIGS. 18A and 18B are graphs illustrating results of quantization in the fifth embodiment.
Figure 18B:
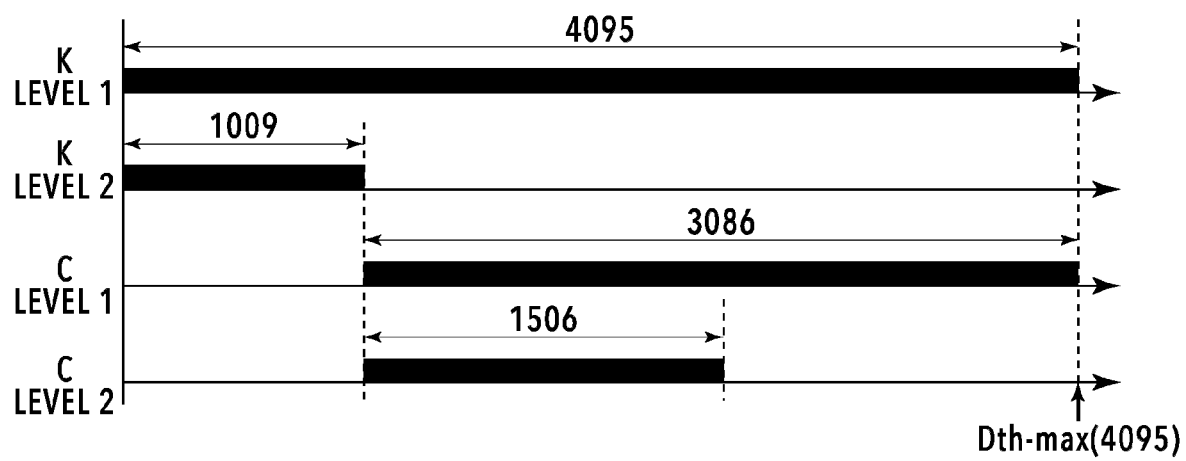

FIGS. 18A and 18B are graphs illustrating results of the inter-color processing in the present embodiment. FIG. 18A is a graph illustrating a results obtained by performing the aforementioned inter-color processing of the present embodiment for each multinary color as in FIG. 9A. FIG. 18B is a graph illustrating a result illustrated in FIG. 18A for each level of each ink color.

In this example, KK, CCK, and CK are used as the multinary colors and the dots are arranged at the pixel positions corresponding to the consecutive thresholds from the minimum value 0, in descending order of dot power, that is in order of KK, CCK, and CK. Specifically, in the present embodiment, the dots can be arranged at the pixel positions corresponding to the consecutive thresholds from the minimum value 0 in the threshold matrix, in descending order of dot power and it is possible to suppress graininess and output a uniform and smooth image.

Figure 19A:
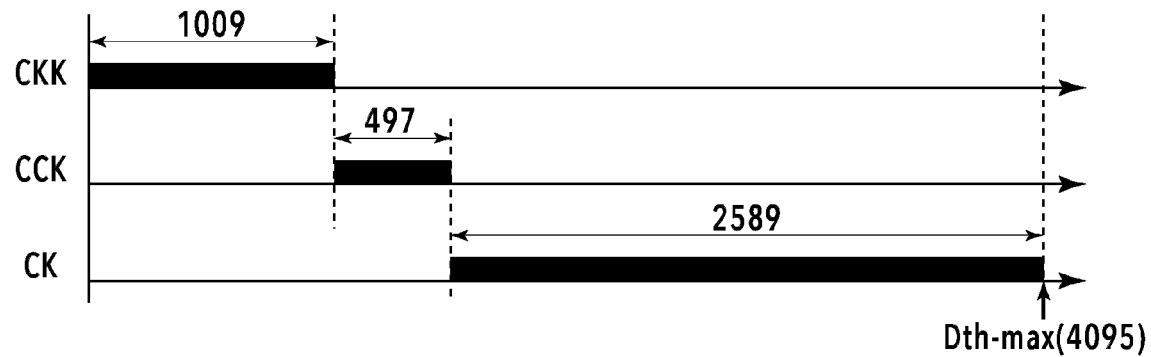
FIGS. 19A and 19B are graphs illustrating results of quantization as a comparative example of the fifth embodiment.
Figure 19B:
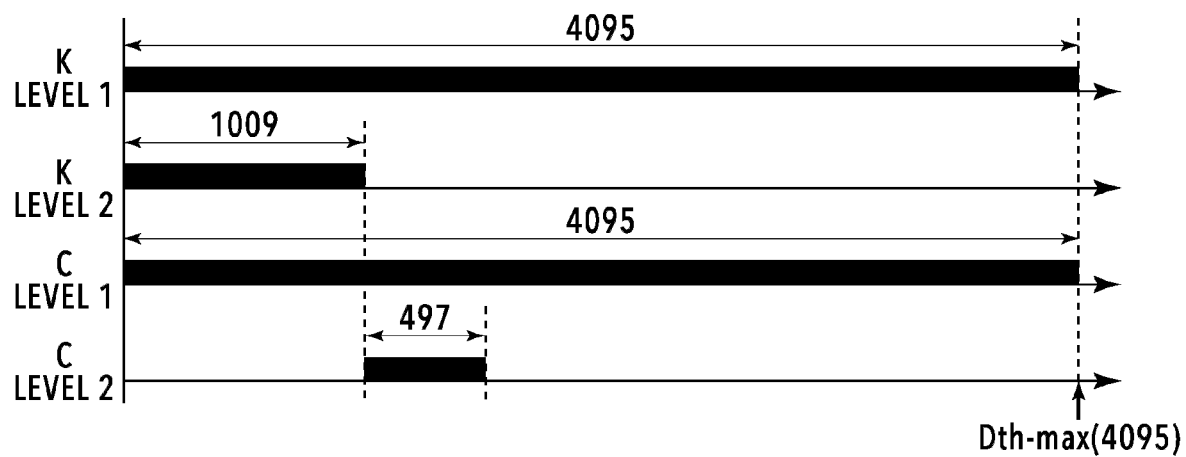

Meanwhile, FIGS. 19A and 19B are graphs illustrating results, obtained in the case where the same received gradation data as that in FIGS. 18A and 18B is subjected to general inter-color processing, as in FIGS. 18A and 18B. Specifically, FIGS. 19A and 19B illustrate results obtained in the case where the inter-color processing is performed on the InC=4592, InM=0, InY=0, and InK=5104 outputted from the normalization processing unit 403 with the first color being InK, the second color being InC, the third color being InM, and the fourth color being InY, as a comparative example.

In comparison between the present embodiment and the comparative example, the multinary colors actually used in print dots in the comparative example are CKK, CCK, and CK while the multinary colors actually used in the present embodiment are KK, CCK, and CK. Specifically, the multinary color with the highest dot power is CKK in the comparative example while the multinary color with the highest dot power is KK with a lower dot power in the present embodiment. Accordingly, in the present embodiment, individual dots can be made less obvious than in the comparative example. In addition, in the present embodiment, the dots can be arranged at the pixel positions corresponding to the consecutive thresholds from the minimum value 0, in descending order of dot power, also for the used multinary colors. As a result, it is possible to suppress graininess and output a uniform and smooth image.

Other Embodiments

The quantization processing of the present invention may employ a mode in which quantization to n-levels from level 0 to level (n−1) is performed in a method different from that in the fifth embodiment. Specific description is given below with reference to FIG. 4 again.

For example, in the case where quantization to three levels (n=3) of level 0, level 1, and level 2 is performed, the normalization processing unit 403 divides 65535-level values expressed in 16 bit into two groups. Then, the normalization processing unit 403 normalizes gradation values of 0 to 32767 and gradation values of 32768 to 65535 that are ranges of the respective groups to 12-bit (0 to 4095 levels) values and sends the normalized values to the multinary color conversion processing unit 404. Thereafter, the multinary color conversion processing unit 404, the dither processing units 410, and the multinary color integration processing unit 411 perform the same processing as that described in the aforementioned embodiments.

In this case, quantized data outputted from the multinary color integration processing unit 411 is binary data corresponding to the ink colors of the printing apparatus. In this example, an index processing unit is additionally provided downstream of the multinary color integration processing unit 411 to determine the quantized value based on a range (first range or second range) in which the received gradation value of the processing target pixel determined in the normalization processing unit 403 is included and the result (1 or 0) of the inter-color processing. Specifically, assume a case where the received gradation value of the processing target pixel is included in the first range (0 to 32767). In this case, the index processing unit outputs level 0 if the result of the inter-color processing is 0, and outputs level 1 if the result of the inter-color processing is 1. Meanwhile, assume a case where the received gradation value of the processing target pixel is included in the second range (32768 to 65535). In this case, the index processing unit outputs level 1 if the result of the inter-color processing is 0, and outputs level 2 if the result of the inter-color processing is 1. The 65535-level values in 16 bit inputted into the normalization processing unit 403 can be thereby each quantized into a three-level value indicating one of level 0, level 1, and level 2. Thereafter, the printing apparatus 100 may print dots depending on the number and size corresponding to the level value such that one dot (or a small dot) is printed in the case where the level value is 1 and two dots (or a large dot) are printed in the case where the level value is 2.

In such quantization processing, the inter-color processing is performed without taking into consideration of the range including the processing target pixel, and multiple dot powers are included in each of the multinary colors. Accordingly, even if the inter-color processing is performed in order of the multinary colors described in the table of FIG. 8 or the like, the dots cannot be arranged at the pixel positions corresponding to the consecutive thresholds from the minimum value 0, in descending order of dot power in a strict sense. However, a difference between multiple dot powers in the same multinary color is smaller than a difference in dot power between different multinary colors and the effects of the present invention can be exhibited also in the case where the quantization processing is performed as in this example.

In the inter-color processing described in the first to fifth embodiments, the threshold Dth is offset by using the calculated offset value Ofs to obtain the quantization threshold Dth', the obtained quantization threshold Dth' is compared with the gradation value In, and the quantized value Out is generated based on the magnitude relationship between the quantization threshold Dth' and the gradation value In. However, the calculated offset value Ofs may be used to offset the gradation value In instead of the threshold Dth. Specifically, the same result can be obtained by adding the calculated offset value Ofs to the gradation value In to obtain a new gradation value In' and comparing the new gradation value In' with the threshold Dth. In any case, it is only necessary to change the difference between the threshold Dth and the gradation value In based on the calculated offset value Ofs and compare the threshold Dth and the gradation value In in the relationship after the changing of the difference.

Although the quantization processing using the inter-color processing is described above, the embodiments may employ an error diffusion method. Specifically, first, the quantization processing for a first multinary color with a high dot power is performed by normal error diffusion processing. Next, the quantization processing for a second multinary color with a lower dot power than the first multinary color is performed. In this case, regarding pixels for which the quantized values of the first multinary color already indicate printing (1), the thresholds are corrected to larger values. Then, in the case where the quantization processing for a third multinary color with a lower dot power than the second multinary color is performed, regarding pixels for which the quantized values of the first multinary color or the second multinary color already indicate printing (1), the thresholds may be corrected to even larger values. This allows the colors to be exclusively arranged in a high dispersity state unique to error diffusion. However, in this example, since the quantization for the second color and beyond are performed based on the result of the quantization processing for the preceding color, the quantization processing cannot be performed in parallel for multiple multinary colors as in the aforementioned embodiments.

Moreover, although the dot power of each color is set based on the lightness L* in the CIEL*a*b* color space in the above description, the dot power may be an optical density or a Y value in a XYZ color space.

In the aforementioned embodiments, the present invention is described as software (application) in the host PC 200 that is an apparatus separate from the printing apparatus 100. However, the present invention can be implemented as, for example, an image processing circuit included in the printing apparatus 100. Some or all of the configurations illustrated in the aforementioned block diagrams may be formed as a hardware circuit.

The present invention can be implemented by supplying a program that implements one or more of the functions in the aforementioned embodiment to a system or an apparatus via a network or a recording medium and causing one or more processors in a computer of the system or the apparatus to perform processing of reading and executing the program. Moreover, the present invention can be implemented by a circuit (for example, ASIC) that implements one or more of the functions.

The present invention is not limited to the embodiments described above and various changes and modifications can be made without departing from the spirit and scope of the present invention. Accordingly, the following claims are added to open the scope of the present invention.

This application claims the benefit of Japanese Patent Application No. 2019-077340 filed Apr. 15, 2019, which is hereby incorporated by reference wherein in its entirety.

According to the present invention, it is possible to suppress graininess and output a uniform and smooth image in an inkjet printing apparatus that prints an image by using multiple types of inks varying in dot power.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus for generating a plurality of first quantized values based on a plurality of first gradation values corresponding respectively to a plurality of inks for each of pixels, the first quantized values indicating printing or non-printing dots with the respective inks, the image processing apparatus comprising:
  a conversion unit configured to convert the plurality of first gradation values to a plurality of second gradation values corresponding respectively to a plurality of multinary colors expressible by combinations of overlapping of the plurality of inks;
  a quantization unit configured to quantize the plurality of second gradation values and generate a plurality of second quantized values indicating printing or non-printing of dots of the respective multinary colors; and
  a generation unit configured to generate the first quantized values corresponding to the plurality of inks based on the second quantized values corresponding respectively to the plurality of multinary colors.

2. The image processing apparatus according to claim 1, wherein, in the case where the plurality of first gradation values for a plurality of pixels corresponding to a predetermined pixel region in a print medium are uniform, the quantization unit generates the plurality of second quantized values such that dots of a first multinary color likely to be visually obvious among the multinary colors are printed with a higher dispersity than dots of a second multinary color less likely to be visually obvious among the multinary colors, in the predetermined pixel region.

3. The image processing apparatus according to claim 2, wherein the quantization unit generates the second quantized values based on the second gradation values and thresholds corresponding to the respective pixels stored in a threshold matrix.

4. The image processing apparatus according to claim 3, wherein
the threshold matrix has a blue noise characteristic, and
the quantization unit generates the second quantized values such that dots of the first multinary color are printed at pixel positions corresponding to consecutive thresholds from a minimum value to a predetermined value among the plurality of thresholds in the threshold matrix and dots of the second multinary color are printed at pixel positions corresponding to consecutive thresholds other than the thresholds from the minimum value to the predetermined value among the plurality of thresholds in the threshold matrix.

5. The image processing apparatus according to claim 4, wherein the first multinary color and the second multinary color have similar hues, and the quantization unit generates the second quantized values such that the dots of the first multinary color and the dots of the second multinary color are printed at pixel positions corresponding to consecutive thresholds from the minimum value among the plurality of thresholds in the threshold matrix.

6. The image processing apparatus according to claim 4, wherein the quantization unit generates the second quantized values of the first multinary color by comparing the thresholds stored in the threshold matrix with the second gradation values of the first multinary color, and generates the second quantized values of the second multinary color by comparing thresholds, obtained by correcting the thresholds stored in the threshold matrix based on the second gradation values of the first multinary color, with the second gradation values of the second multinary color.

7. The image processing apparatus according to claim 4, wherein the quantization unit generates the second quantized values of the first multinary color by comparing the thresholds stored in the threshold matrix with the second gradation values of the first multinary color, and generates the second quantized values of the second multinary color by comparing values, obtained by correcting the second gradation values of the second multinary color based on the second gradation values of the first multinary color, with the thresholds.

8. The image processing apparatus according to claim 1, wherein
the conversion unit divides the plurality of inks into a first group and a second group,
generates the second gradation values, each corresponding to one of a plurality of multinary colors expressible by a combination of overlapping of the inks in the first group, based on the first gradation values corresponding to the first group, and
generates the second gradation values, each corresponding to one of a plurality of multinary colors expressible by a combination of overlapping of the inks in the second group, based on the first gradation values corresponding to the second group, and
the quantization unit generates the second quantized values for the multinary colors corresponding to the first group based on thresholds stored in a first threshold matrix, and generates the second quantized values for the multinary colors corresponding to the second group based on thresholds stored in a second threshold matrix different from the first threshold matrix.

9. The image processing apparatus according to claim 8, wherein the conversion unit causes an ink with relatively low lightness among the plurality of inks to be included the first group and causes an ink with relatively high lightness among the plurality of inks to be included in the second group.

10. The image processing apparatus according to claim 2, wherein
the quantization unit quantizes the plurality of second gradation values by using error diffusion processing and generates the plurality of second quantized values, and
corrects the thresholds used in the quantization of the second gradation values corresponding to the second multinary color based on the first gradation values corresponding to the second multinary color.

11. The image processing apparatus according to claim 1, wherein the conversion unit generates the plurality of second gradation values such that a difference between lightness of a white region of a print medium and lightness of the multinary color with the lowest lightness among the multinary colors whose second gradation values are not 0 is small.

12. The image processing apparatus according to claim 1, wherein the conversion unit generates the plurality of second gradation values such that a difference in lightness between the multinary colors whose second gradation values are not 0 among the plurality of multinary colors is small.

13. The image processing apparatus according to claim 1, wherein the plurality of inks include inks of black, cyan, magenta, and yellow.

14. The image processing apparatus according to claim 13, wherein the plurality of inks further include at least one of inks of red, green, blue, gray, light cyan, and light magenta.

15. The image processing apparatus according to claim 1, wherein the image processing apparatus further comprises an ejection unit configured to eject the plurality of inks according to the plurality of first quantized values.

16. A non-transitory computer-readable storage medium storing a program for causing a computer to function as an image processing apparatus for generating a plurality of first quantized values based on a plurality of first gradation values corresponding respectively to a plurality of inks for each of pixels, the first quantized values indicating printing or non-printing dots with the respective inks,
the image processing apparatus comprising:
a conversion unit configured to convert the plurality of first gradation values to a plurality of second gradation values corresponding respectively to a plurality of multinary colors expressible by combinations of overlapping of the plurality of inks;
a quantization unit configured to quantize the plurality of second gradation values and generate a plurality of second quantized values indicating printing or non-printing of dots of the respective multinary colors; and
a generation unit configured to generate the first quantized values corresponding to the plurality of inks based on the second quantized values corresponding respectively to the plurality of multinary colors.

17. An image processing method of generating a plurality of first quantized values based on a plurality of first gradation values corresponding respectively to a plurality of inks for each of pixels, the first quantized values indicating printing or non-printing of dots with the respective inks, the image processing method comprising converting the plurality of first gradation values to a plurality of second gradation values corresponding respectively to a plurality of multinary colors expressible by combinations of overlapping of the plurality of inks;

quantizing the plurality of second gradation values and generating a plurality of second quantized values indicating printing or non-printing of dots of the respective multinary colors; and generating the first quantized values corresponding to the plurality of inks based on the second quantized values corresponding respectively to the plurality of multinary colors.

18. An image processing apparatus for generating a plurality of first quantized values based on a plurality of first gradation values corresponding respectively to a plurality of inks for each of pixels, the first quantized values indicating printing or non-printing of dots with the respective inks, the image processing apparatus comprising:
a conversion unit configured to convert the plurality of first gradation values to a plurality of second gradation values corresponding respectively to a plurality of multinary colors expressible by combinations of overlapping of the plurality of inks;

a quantization unit configured to quantize the plurality of second gradation values and generate a plurality of second quantized values indicating printing or non-printing of dots of the respective multinary colors; and a generation unit configured to generate the first quantized values corresponding respectively to the plurality of inks based on the second quantized values corresponding respectively to the plurality of multinary colors, wherein the quantization unit
compares a threshold stored in a threshold matrix with the second gradation value of a first multinary color likely to be visually obvious among the plurality of multinary colors to generate the second quantized value of the first multinary color, and changes a difference between the threshold used in the comparison with the second gradation value of the first multinary color and the second gradation value of a second multinary color that is less likely to be visually obvious among the plurality of multinary colors based on the second gradation value of the first multinary color and then generates the second quantized value of the second multinary color based on a relationship between the threshold after the change and the second gradation value of the second multinary color.

19. The image processing apparatus according to claim 18, wherein the threshold matrix has a blue noise characteristic.

20. An image processing method of generating a plurality of first quantized values based on a plurality of first gradation values corresponding respectively to a plurality of inks for each of pixels, the first quantized values indicating printing or non-printing of a dots with the respective inks, the image processing method comprising:
converting the plurality of first gradation values to a plurality of second gradation values corresponding respectively to a plurality of multinary colors expressible by combinations of overlapping of the plurality of inks;

quantizing the plurality of second gradation values and generating a plurality of second quantized values indicating printing or non-printing of dots of the respective multinary colors; and generating the first quantized values corresponding respectively to the plurality of inks based on the second quantized values corresponding respectively to the plurality of multinary colors, wherein in the quantizing,
a threshold stored in a threshold matrix is compared with the second gradation value of a first multinary color likely to be visually obvious among the plurality of multinary colors to generate the second quantized value of the first multinary color, and a difference between the threshold used in the comparison with the second gradation value of the first multinary color and the second gradation value of a second multinary color that is less likely to be visually obvious among the plurality of multinary colors is changed based on the second gradation value of the first multinary color and then the second quantized value of the second multinary color is generated based on a relationship between the threshold after the change and the second gradation value of the second multinary color.

* * * * *